United States Patent [19]

Oka et al.

[11] Patent Number: 5,675,151
[45] Date of Patent: Oct. 7, 1997

[54] DISTRIBUTION TYPE DETECTOR USING SCINTILLATION FIBERS

[75] Inventors: Toru Oka; Kazunori Ikegami, both of Hyogo, Japan

[73] Assignee: Mitsubishi Denki Kabushiki Kaisha, Tokyo, Japan

[21] Appl. No.: 528,671

[22] Filed: Sep. 15, 1995

[30] Foreign Application Priority Data

Sep. 26, 1994 [JP] Japan ................... 6-229501

[51] Int. Cl.$^6$ ................ G01T 1/20; G01T 1/208
[52] U.S. Cl. .............. 250/368; 250/366; 250/367; 250/369
[58] Field of Search .................... 250/366, 367, 250/368, 369, 370.1, 370.11, 390.11, 390.12

[56] References Cited

U.S. PATENT DOCUMENTS 3,978,337  8/1976  Nickles et al. ................... 250/367

FOREIGN PATENT DOCUMENTS 60-207084  10/1985  Japan ................... 250/368

OTHER PUBLICATIONS

"Measurement of Spatial Dose-Rate Distribution Using a Position Sensitive Detector", Emoto et al., KEK Proceedings, 94-7, pp. 119-125, Aug. 1994.

Fries et al., "Position Sensitive Fiber Readout", Nuclear Instruments & Methods in Physics Research, vol. 349, No. 1, pp. 197-203, Sep. 15, 1994.

*Primary Examiner*—Edward J. Glick
*Attorney, Agent, or Firm*—Sughrue, Mion, Zinn, Macpeak & Seas

[57] ABSTRACT

A distribution type detector comprises scintillation fibers identical in length to each other, an optical delay fiber having a refractive index substantially identical to those of cores and claddings of the scintillation fibers, photosensitive elements, preamplifiers, constant fraction discriminators, a time-to-pulse height converter, an analog-to-digital converter, and a multichannel pulse-height analyzer. A position where a radiation falls on its corresponding scintillation fiber, is detected based on a difference between time intervals necessary for propagation of optical pulses produced in the corresponding scintillation fiber by the radiation. Thus, even if the length of each scintillation fiber is increased, position resolution can be kept high and a measuring circuit system can be simplified.

18 Claims, 26 Drawing Sheets

F I G. 7
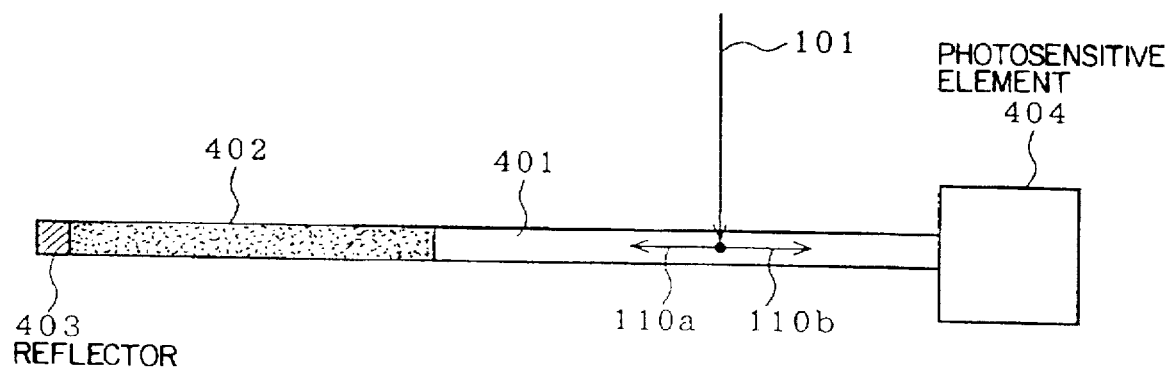

801

901

DISTRIBUTION TYPE DETECTOR USING SCINTILLATION FIBERS

BACKGROUND OF THE INVENTION

1. Field of the Invention

The present invention relates to a distribution type detector using at least one scintillation fiber, which detects an incident position of radiation on the scintillation fiber or its intensity (a dose rate relative to the radiation). This distribution type detector can be used for detecting an optical pulse in a specific wavelength region.

2. Description of the Related Art

FIG. 38 is a view showing the configuration of a conventional distribution type detector using a scintillation fiber described in, for example, a collection of summarized articles issued by a next-generation radiation measuring system research institute, p.p. 44. In the drawing, reference numeral 101 indicates collimated radiation. Reference symbols 110a and 110b respectively indicate optical pulses produced by fluorescence. Reference numeral 3201 indicates a scintillation fiber. Reference symbols 104a and 104b respectively indicate photosensitive elements connected to the scintillation fiber 3201. Reference symbols 105a and 105b indicate preamplifiers respectively. Reference symbols 106a and 106b indicate constant fraction discriminators respectively. Reference numeral 3202 indicates a signal delay circuit. Reference numeral 107 indicates a time-to-pulse height converter. Reference numeral 108 indicates an analog-to-digital converter. Reference numeral 109 indicates a multichannel pulse-height analyzer.

The conventional distribution type detector using the scintillation fiber is constructed as described above. When one radiation 101 falls on the scintillation fiber 3201, fluorescence is produced within the scintillation fiber 3201 so that the optical pulses 110a and 110b are propagated toward both ends of the scintillation fiber 3201. Thereafter, the optical pulses 110a and 110b respectively enter into the photosensitive elements 104a and 104b where they are converted into electric pulse signals respectively. Next, the signals are respectively amplified by the preamplifiers 105a and 105b. The amplified signals are respectively waveform-shaped by the constant fraction discriminators 106a and 106b which are timing pulse generating circuits, followed by conversion into signals each indicative of the pulse time. The signal outputted from the constant fraction discriminator 106a passes through the signal delay circuit 3202 from which a signal is outputted so that the time to output the signal becomes later than that of the signal outputted from the constant fraction discriminator 106b. Thereafter, the two signals are inputted to the time-to-pulse height converter 107 with a given time difference between the two signals. The time-to-pulse height converter 107 needs to determine the sequence of the pulses inputted to two input terminals thereof. Further, the required minimum value is included in the time difference between the firstly-input pulse and the subsequently-input pulse. When the time difference is less than or equal to the required minimum value, an accurate time difference cannot be measured. The signal delay circuit 3202 is provided to meet the above condition even if the radiation 101 falls on any position of the scintillation fiber 3201. Thus, a delay time of the signal delay circuit 3202 must be greater than the sum of a time interval necessary for the optical pulse to propagate over the entire length of the scintillation fiber and the above minimum time. If a difference between the length of a cable connected between circuits and the length of a cable connected between other circuits exists on the firstly-input pulse side and the subsequently-input pulse side, then the difference must be considered as a factor that leads up to the time difference. The time-to-pulse height converter 107 outputs an electric pulse having a pulse height proportional to the above time difference. The electric pulse is inputted to the multichannel pulse-height analyzer 109 through the analog-to-digital converter 108. The scintillation fiber 3201 is supplied not only with one radiation 101 alone but with several radiations 101. However, the incident positions of the radiations 101 on the scintillation fiber 3201 can be determined by discriminating between the pulse heights by the multichannel pulse-height analyzer 109. Further, a dose rate can be detected from the number of counts.

The signal delay circuit is used under the above-described construction in the conventional distribution type detector using the scintillation fiber. Therefore, when the length of the scintillation fiber is increased, the delay time of the signal delay circuit must be made longer and hence the maximum time difference between the two signals inputted to the time-to-pulse height converter is affected by the length of the scintillation fiber and the delay time of the signal delay circuit. When the time difference becomes greater than a predetermined value, an input time-difference range of the time-to-pulse height converter must be raised. As a result, position resolution at the measurement of the incident position of the radiation on the scintillation fiber becomes poor. Since the measuring circuits are connected to both ends of the scintillation fiber on a two-system basis, an error is produced due to the difference in characteristics between the circuits, thereby causing a reduction in the accuracy of the detector. Further, the distribution type detector has problems in that, for example, the energy of an incident radiation cannot be identified, an energy characteristic relative to the radiation is poor due to a thin detecting unit, a measuring range is small, a dependence on the position of irradiation of the radiation exists, an increase in position resolution falls into difficulties due to a circuit characteristic, and a size reduction in the detector falls into difficulties due to the existence of two-systematic measuring circuits.

SUMMARY OF THE INVENTION

With the foregoing problems of prior art in view, it is therefore a first object of the present invention to eliminate, by using an optical delay fiber, the need for a signal delay circuit whose delay time is long and to improve position resolution.

It is a second object of the present invention to reduce an error in measurement, which is produced due to the difference in characteristic depending on the systems, by uniting measuring circuits that needed two systems in the prior art into one system so as to simplify the united measuring circuit.

It is a third object of the present invention to measure an energy spectrum of a radiation or a light pulse simultaneously with the incident position of the radiation or the light pulse and its intensity.

Other objects of the present invention are to obtain a high sensitivity upon radiation detection, to increase a range of energy to be measured while a dependence of sensitivity on the energy remains low, reduce a dependence on the irradiated position of the radiation and to make it easier to calibrate the irradiated position of radiation or its intensity.

In a distribution type detector using scintillation fibers, according to a first aspect of the present invention, a scintillation fiber is connected to an optical delay fiber. Ends of the fibers are respectively connected to photosensitive elements, followed by connection to preamplifiers, constant fraction discriminators, a time-to-pulse height converter, an analog-to-digital converter and a multichannel pulse-height analyzer.

In a distribution type detector using scintillation fibers, according to a second aspect of the present invention, an optical delay fiber is inserted into and connected to a central portion of the scintillation fiber. Further, a time-to-pulse height converter does not draw a distinction between a terminal supplied with a firstly propagated signal and a terminal supplied with a subsequently propagated signal.

In a distribution type detector using a scintillation fiber, according to a third aspect of the present invention, one end face of the scintillation fiber and an end face of an optical delay fiber connected to the other end of the scintillation fiber are connected to the same photosensitive element. The photosensitive element, a preamplifier and a constant fraction discriminator are respectively provided as single. Two optical signals propagated to both ends of the scintillation fiber are received by the single photosensitive element. Further, a measuring circuit is used which is capable of measuring the difference between time intervals necessary for the two optical signals to reach the photosensitive element.

In a distribution type detector using a scintillation fiber, according to a fourth aspect of the present invention, a photosensitive element is connected to one end of the scintillation fiber. A reflector is attached to an end face of an optical delay fiber connected to the other end of the scintillation fiber. The photosensitive element, a preamplifier and a constant fraction discriminator are respectively provided as single. Two optical signals corresponding to an optical signal directly incident on the single photosensitive element and an optical signal reflected from the reflector enter into the single photosensitive element with a time difference made between the two optical signals. However, the distribution type detector utilizes a measuring circuit capable of measuring the time difference.

In a distribution type detector using a scintillation fiber, according to a fifth aspect of the present invention, an analog-to-digital converter and a multichannel pulse-height analyzer are provided for measuring an energy spectrum of an optical pulse incident on the scintillation fiber based on branched output signals. The branched output signals are obtained from an output produced from at least one amplifier.

In a distribution type detector using a scintillation fiber, according to a sixth aspect of the present invention, a loss of an optical signal, which is produced by its propagation distance, is compensated by software or hardware.

In a distribution type detector using scintillation fibers, according to a seventh aspect of the present invention, a plurality of the scintillation fibers are shaped in the form of a bundle and the scintillation fiber bundle is constructed as a detecting unit.

In a distribution type detector using scintillation fibers, according to an eighth aspect of the present invention, a fiber plate obtained by shaping a plurality of scintillation fibers in the form of a plate is constructed as a detecting unit.

In a distribution type detector using scintillation fibers, according to a ninth aspect of the present invention, a plurality of fiber plates each obtained by shaping a plurality of the scintillation fibers in the form of a plate are disposed in parallel.

In a distribution type detector using scintillation fibers, according to a tenth aspect of the present invention, each of fiber plates is produced by shaping a plurality of the scintillation fibers in the form of a plate. A combination obtained by stacking two fiber plates on one another so that fiber extending directions intersect at right angles, is provided as at least one pair of fiber plates.

In a distribution type detector using a scintillation fiber, according to an eleventh aspect of the present invention, material capable of absorbing a low-energy radiation is disposed forward of the scintillation fiber used as a detecting unit.

In a distribution type detector using a scintillation fiber, according to a twelfth aspect of the present invention, material capable of backscattering a high-energy radiation is disposed behind the scintillation fiber used as a detecting unit.

In a distribution type detector using a scintillation fiber, according to a thirteenth aspect of the present invention, inorganic scintillator material which includes an element having a higher atomic number and is large in specific gravity, is used as a material for the scintillation fiber.

In a distribution type detector using a scintillation fiber, according to a fourteenth aspect of the present invention, a light amplifier is provided on a path of the scintillation fiber or an optical delay fiber.

In a distribution type detector using a scintillation fiber, according to a fifteenth aspect of the present invention, a fiber doped with a wavelength shifter material is provided on the input side of a light amplifier.

In a distribution type detector using scintillation fibers, according to a sixteenth aspect of the present invention, radiation sources are respectively attached to the scintillation fibers.

A distribution type detector using a scintillation fiber, according to a seventeenth aspect of the present invention includes a drive mechanism for driving the scintillation fiber used as a detecting unit in the direction orthogonal to that of the scintillation fiber.

In a distribution type detector using a scintillation fiber, according to an eighteenth aspect of the present invention, a photosensitive element is embedded in an at least one end of the fiber by micromachining technology.

According to the distribution type detector using the scintillation fibers, of the first aspect of the present invention, the scintillation fiber is connected to the optical delay fiber. The ends of the fibers are respectively connected with the photosensitive elements, followed by connection with the preamplifiers, the constant fraction discriminators, the time-to-pulse height converter, the analog-to-digital converter and the multichannel pulse-height analyzer. Thus, the use of the optical delay fiber enables an improvement in position resolution, simplification of a measuring circuit system, integration of measuring circuits into one system, etc.

According to the distribution type detector using the scintillation fibers, of the second aspect of the present invention, the optical delay fiber is inserted into and connected to the central portion of the scintillation fiber so that the difference between the time intervals necessary for the two signals inputted to the time-to-pulse height converter to reach the time-to-pulse height converter becomes greater than a predetermined value. The distribution type detector is provided with the time-to-pulse height converter which does not draw a distinction between the terminal supplied with the firstly propagated signal and the terminal supplied with the subsequently propagated signal. This construction eliminates the need for the change of the length of the optical delay fiber to another even if each scintillation fiber increases in length. Thus, the maximum time difference inputted to the time-to-pulse height converter is affected by the length of each scintillation fiber alone. The value of its length becomes (n+t)/(2n+t) times the value employed in the prior art, where n represents a time necessary for each optical pulse to propagate over the entire length of each scintillation fiber and t indicates a required minimum time difference between the firstly input pulse and the subsequently input pulse, into the time-to-pulse height converter. Hereinafter, the required minimum time difference is referred to as an unmeasurable time. The length of the optical delay fiber may be set so that the propagation time of light becomes longer than the dead time produced in the time-to-pulse height converter. The value of the length thereof is equal to t/(n+t) times the value employed in the prior art. In doing so, the rising edge of the signal pulse can be restrained from expanding, thereby making it possible to improve position resolution as compared with the prior art.

According to the distribution type detector using the scintillation fiber, of the third aspect of the present invention, the one end face of the scintillation fiber and the end face of the optical delay fiber connected to the other end of the scintillation fiber are connected to the same photosensitive element. The photosensitive element, the preamplifier and the constant fraction discriminator are respectively provided as single. The two optical signals propagated to both ends of the scintillation fiber are received by the single photosensitive element. Further, the measuring circuit is used which is capable of measuring the difference between the time intervals necessary for the two optical signals incident on the single photosensitive element to reach the photosensitive element. Due to this construction, measuring circuits are integrated into one system. An error produced due to the difference in characteristic between measuring instruments can be eliminated and the detector can be reduced in size.

According to the distribution type detector using the scintillation fiber, of the fourth aspect of the present invention, the photosensitive element is connected to the one end face of the scintillation fiber. The reflector is attached to the end face of the optical delay fiber connected to the other end of the scintillation fiber. The photosensitive element, the preamplifier and the constant fraction discriminator are respectively provided as single. The two optical signals corresponding to the optical signal directly incident on the single photosensitive element and the optical signal reflected from the reflector enter into the single photosensitive element with the time difference made between the two optical signals. However, the distribution type detector utilizes the measuring circuit capable of measuring the time difference. Due to this construction, one-systematic measuring circuit can be set up and an error produced due to the difference in characteristic between measuring instruments can be eliminated.

According to the distribution type detector using the scintillation fiber, of the fifth aspect of the present invention, a preamplifier is provided which is capable of outputting two signals therefrom in response to a single signal inputted thereto. One of the two outputs is used for measurement of a position of an incident radiation or an incident optical pulse in a given wavelength region, whereas the other of the two outputs is used for measurement of the distribution of energy. Due to this construction, the distribution of energy can be also measured as well as the incident position of the radiation or the optical pulse.

According to the distribution type detector using the scintillation fiber, of the sixth aspect of the present invention, the loss of the optical signal, which is produced by its propagation distance, is compensated by software or hardware. Thus, the difference between distribution results on energy at respective incident positions of a radiation to be measured or a light pulse to be measured, in a given wavelength region can be reduced.

According to the distribution type detector using the scintillation fibers, of the seventh aspect of the present invention, a plurality of the scintillation fibers are shaped in the form of the bundle and the scintillation fiber bundle is constructed as the detecting unit. Due to this construction, the probability that an incident radiation or optical pulse in a given wavelength region will react within each scintillation fiber by fluorescence, can be raised and the quantity of light incident on each photosensitive element can be also increased.

According to the distribution type detector using the scintillation fibers, of the eighth aspect of the present invention, the fiber plate obtained by shaping the plurality of the scintillation fibers in the form of the plate is constructed as the detecting unit. Thus, a position of an incident radiation or an incident position of an optical pulse in a given wavelength region can be measured on a two-dimensional basis.

According to the distribution type detector using the scintillation fiber, of the ninth aspect of the present invention, since the plurality of fiber plates are disposed in parallel, the distribution type detector can measure a track of a radiation or a light pulse in a wavelength region.

According to the distribution type detector using the scintillation fiber, of the tenth aspect of the present invention, since the fiber plates are stacked on one another so that the fiber extending directions intersect at right angles, a reduced number of photosensitive elements can measure each incident position of a radiation or an optical pulse on a two-dimensional basis.

According to the distribution type detector using the scintillation fiber, of the eleventh aspect of the present invention, the material capable of absorbing the low-energy radiation is disposed forward of the scintillation fiber used as the detecting unit. Due to this construction, the difference between the probability that the low-energy radiation will react within the scintillation fiber and the probability that a high-energy radiation will react within the scintillation fiber, can be reduced and the sensitivity of a dose rate with respect to the energy of the radiation can be flattened.

According to the distribution type detector using the scintillation fiber, of the twelfth aspect of the present invention, the material capable of backscattering the high-energy radiation is disposed behind the scintillation fiber used as the detecting unit. Due to this construction, the difference between the probability that a low-energy radiation will react within the scintillation fiber and the probability that the high-energy radiation will react within the scintillation fiber, can be reduced and the sensitivity of a dose rate with respect to the energy of the radiation can be flattened.

According to the distribution type detector using the scintillation fiber, of the thirteenth aspect of the present invention, the inorganic scintillator material is used as the material for the scintillation fiber. Due to this construction, the probability that a high-energy radiation will react within the scintillation fiber, can be raised.

According to the distribution type detector using the scintillation fiber, of the fourteenth aspect of the present invention, the light amplifier is provided on the path of the scintillation fiber or the optical delay fiber. Owing to this construction, a transmission loss of light propagated within the fiber can be supplemented and hence a measuring range can be expanded.

According to the distribution type detector using the scintillation fiber, of the fifteenth aspect of the present invention, the fiber doped with the wavelength shifter material is provided between the scintillation fiber and the light amplifier. Due to this construction, the wavelength of each optical pulse produced by fluorescence within the scintillation fiber can be shifted to an amplifierable wavelength band of the light amplifier by the wavelength shifter even if the wavelength of each optical pulse is shorter than the amplifierable wavelength band thereof. As a result, a transmission loss of light propagated within the fiber can be supplemented and hence a measuring range can be expanded.

According to the distribution type detector using the scintillation fibers, of the sixteenth aspect of the present invention, the radiation sources are respectively attached to the scintillation fibers. By providing the radiation sources used as standards for position measurement in this way, position accuracy with respect to the measurement of a position where a radiation or an optical pulse in a given wavelength region enters into its corresponding scintillation fiber, can be improved.

According to the distribution type detector using the scintillation fiber, of the seventeenth aspect of the present invention, the scintillation fiber, which serves as the detecting unit, is set to a movable type. By doing so, a measuring range can be expanded and a spatial distribution of a radiation to be measured or an optical pulse in a given wavelength region can be measured.

According to the distribution type detector using the scintillation fiber, of the eighteenth aspect of the present invention, the photosensitive element is embedded in the end of the fiber by micromachining technology. Due to this construction, the detector can be reduced in size. Further, a loss of light transmitted within the fiber, which is produced at the end face of the fiber, can be reduced, thereby making it possible to expand a measuring range.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

The invention will now be described with reference to the accompanying drawings wherein:

FIG. 7 is a partial schematic view showing a sixth embodiment of the present invention;

DETAILED DESCRIPTION OF THE PREFERRED EMBODIMENTS

Preferred embodiments of the present invention will hereinafter be described in detail with reference to the accompanying drawings.

[First Embodiment]

Figure 1:
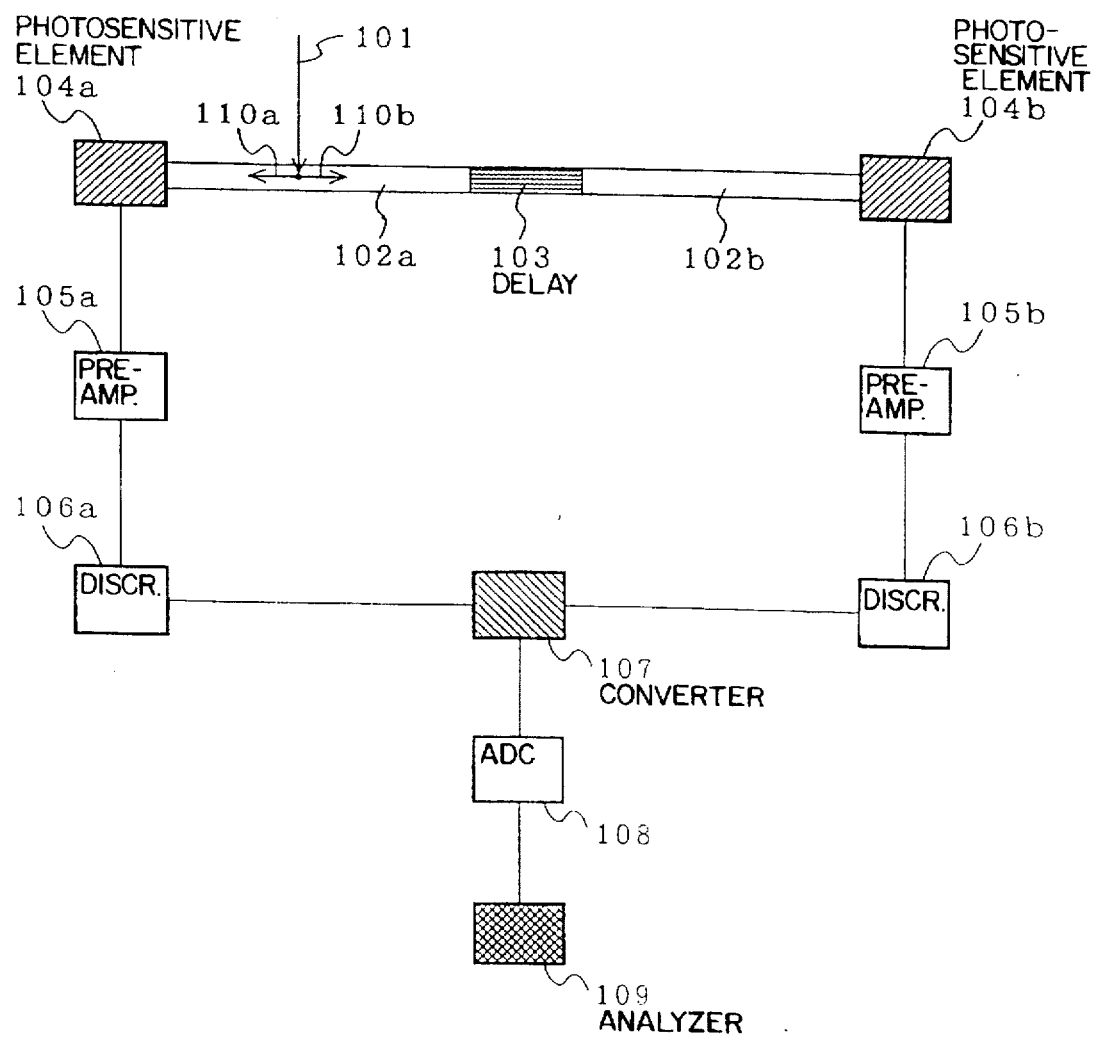
FIG. 1 is an overall schematic view showing a first embodiment of the present invention.

FIG. 1 is a configurational view showing a distribution type detector according to a first embodiment of the present invention. In FIG. 1, reference numeral 101 indicates radiation to be measured, i.e., an optical pulse in a specific wavelength region. Reference numerals 102a and 102b respectively indicate scintillation fibers identical in length to one another. Reference numeral 103 indicates an optical delay fiber having a refractive index substantially identical to that of each core of the scintillation fibers 102a and 102b. The scintillation fibers 102a and 102b emit or give fluorescence in response to a radiation or light in a specific wavelength region, such as ultraviolet radiation or rays. However, as the optical delay fiber, one that does not produce fluorescence is employed. Reference numerals 104a and 104b indicate photosensitive elements respectively and reference numerals 105a and 105b indicate preamplifiers respectively. Reference numerals 105a and 106b indicate constant fraction discriminators respectively. Reference numeral 107 indicates a time-to-pulse height converter. In response to one radiation or an optical pulse in a given wavelength region, two timing pulses are respectively inputted to two input terminals of the time-to-pulse height converter 107. However, different from the conventional one, the time-to-pulse height converter 107 is capable of measuring a time difference regardless of which one of the pulses is firstly inputted. Reference numeral 108 indicates an analog-to-digital converter. Reference numeral 109 indicates a multichannel pulse-height analyzer. Designated at numerals 110a and 110b are respectively optical pulses generated by fluorescence.

The operation of the distribution type detector shown in FIG. 1 will now be described.

When the radiation or light pulse 101 in the specific wavelength region falls on or strikes the scintillation fiber 102a or 102b, fluorescence is produced therein so that the generated optical pulses 110a and 110b are propagated toward both ends of the scintillation fiber 102a or 102b. At this time, no fluorescence is produced even if the radiation or light pulse 101 in the given wavelength region is launched into the optical delay fiber 103. After the optical pulses 110a and 110b have been propagated through the scintillation fibers 102a and 102b respectively, they enter into their corresponding photosensitive elements 104a and 104b. The photosensitive elements 104a and 104b respectively convert the optical pulses 110a and 110b into electric signals. Thereafter, the converted electric signals are successively amplified by the preamplifiers 105a and 105b. Further, the constant fraction discriminators 106a and 106b shape the waveforms of the amplified electric signals into waveforms suitable for timing pulses respectively. The time-to-pulse height converter 107 outputs an electric pulse having a wave or pulse height proportional to the time difference between the two signals inputted to the time-to-pulse height converter 107. Thereafter, the analog-to-digital converter 108 converts a crest value of the analog signal into digital form, followed by inputting to the multichannel pulse-height analyzer 109 where the signal is counted at each value thereof.

To the time-to-pulse height converter 107, the two timing pulses are inputted in response to the radiation or optical pulse in the given wavelength region. These two timing pulses are inputted thereto with a given time difference produced between them at all times by the optical delay fiber 103. By adjusting the length of the optical delay fiber 103, the minimum value of the time difference between the two timing pulses inputted to the time-to-pulse height converter 107 can be adjusted. When the time difference between the firstly input signal and the subsequently input signal is less than or equal to a predetermined value, the time-to-pulse height converter 107 produces an error in measurement. However, this error can be eliminated by setting the length of the optical delay fiber 103 to a predetermined value or more. When the length of each scintillation fiber is made longer, the maximum time difference between the two timing pulses inputted to the time-to-pulse height converter 107 becomes greater. It is however unnecessary to increase the length of the optical delay fiber 103 by using the aforementioned optical delay fiber 103 as an alternative to a conventional signal delay circuit and using the aforementioned time-to-pulse height converter 107. Namely, the optical delay fiber 103 may be provided by a length equivalent to the aforementioned unmeasurable time period at a position of the time-to-pulse height converter 107, which corresponds to the aforementioned unmeasurable time period. It is unnecessary to set the length of the optical delay fiber 103 to a delay time longer than a time during which an optical pulse is propagated over the entire length of a scintillation fiber as in the case of the conventional signal delay circuit 3202. Namely, the length of the optical delay fiber 103 may be set in such a way that the propagation time of light becomes longer than the aforementioned unmeasurable time, in the time-to-pulse height converter. The value of the length thereof is equal to t/(n+t) (where n: time during which an optical pulse is propagated over the entire length of each scintillation fiber and t: aforementioned unmeasurable time in the time-to-pulse height converter) times the value employed in the prior art. In doing so, the rising edge of the signal pulse can be restrained from expanding, thereby making it possible to improve position resolution as compared with the prior art.

At this time, the maximum time difference between the two timing pulses becomes (n+t)/(2n+t) times the conventional one. Thus, a time difference range of the time-to-pulse height converter can be kept low so that the position resolution for position detection can be raised as compared with the prior art.

Since the signal delay circuit can be omitted, a measurement system can be simplified. Further, since the optical delay fiber is superior in high-frequency characteristic to an electrical signal delay circuit, the distortion of a waveform to be transmitted is lowered and a change of the delay time due to a change in temperature is reduced. It is therefore possible to improve a position detecting precision.

Figure 2:
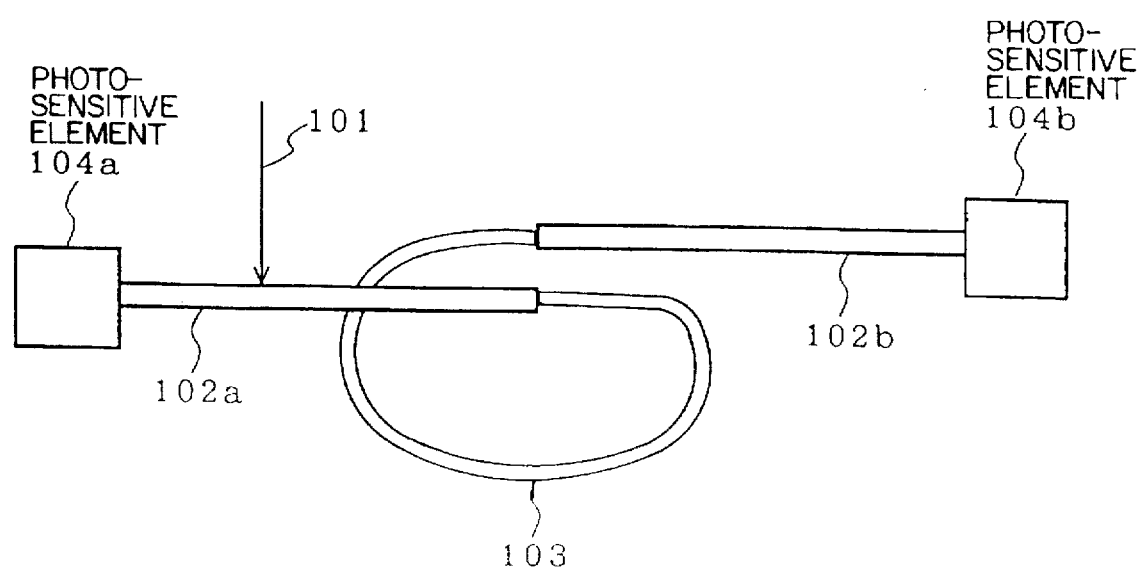
FIG. 2 is a partial schematic view illustrating the first embodiment of the present invention.

FIG. 2 shows the way of laying out the optical delay fiber and the scintillation fibers both employed in the first embodiment.

Since the optical delay fiber 103 is provided at the position corresponding to the unmeasurable time period of the time-to-pulse height converter 107 as described above, the region of the optical delay fiber 103 is an unmeasurable region if the optical delay fiber 103 is linearly disposed as shown in FIG. 1. To avoid this, the optical delay fiber 103 may be disposed in such a way that a space is not provided between the scintillation fibers 102a and 102b as shown in FIG. 2. As the fibers, scintillation fibers shielded against the radiation or light may be used.

[Second Embodiment]

Figure 3:
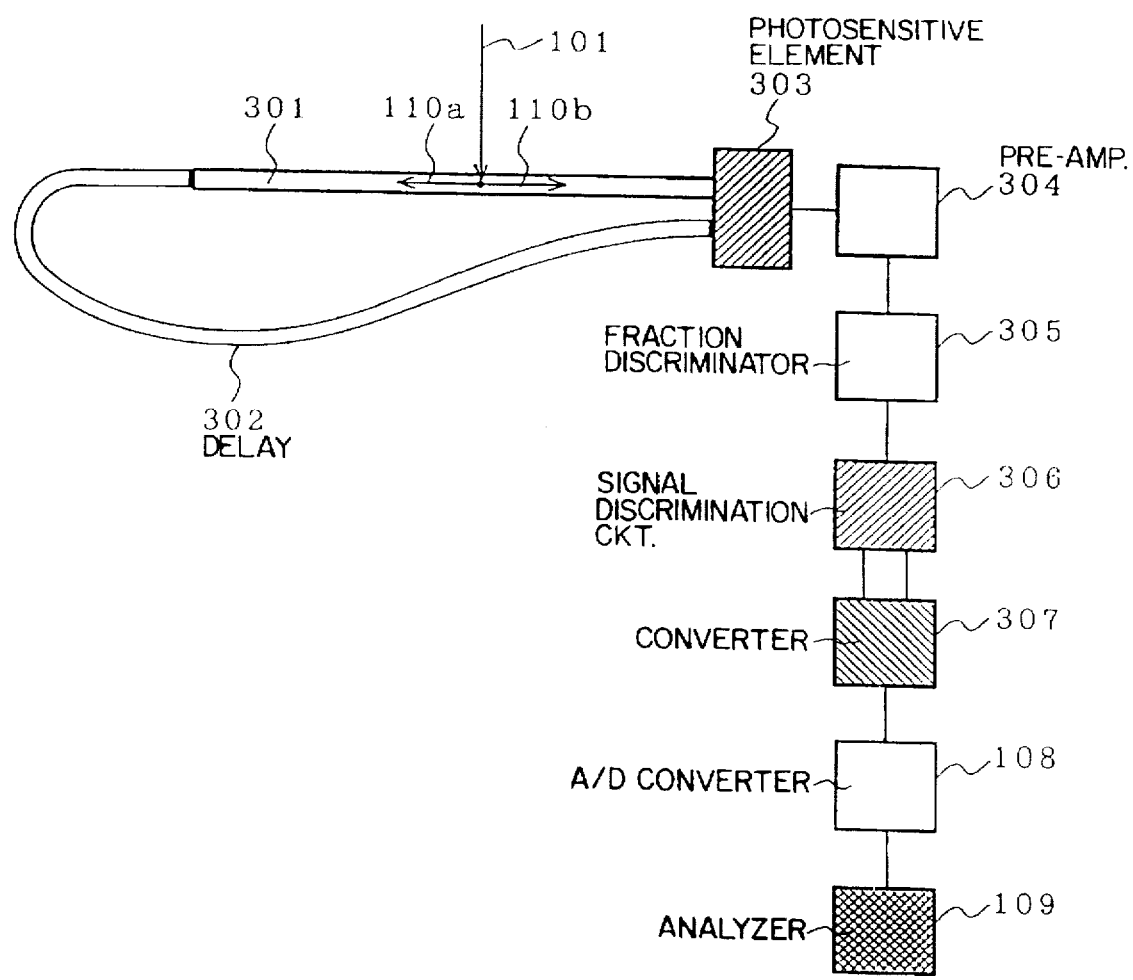
FIG. 3 is an overall schematic view depicting a second embodiment of the present invention.

FIG. 3 is a configurational view showing a distribution type detector according to a second embodiment. There are shown in FIG. 3, a scintillation fiber 301, an optical delay fiber 302, a photosensitive element 303 for receiving therein two optical pulses generated based on one radiation or an optical pulse in a given wavelength region, a preamplifier 304, a constant fraction discriminator 305, a signal discriminating circuit 306 for causing two timing pulses outputted from the constant fraction discriminator 305 to branch to two and for outputting the firstly input pulse and the subsequently input pulse from terminals different from one another, and a time-to-pulse height converter 307.

The operation of the distribution type detector shown in FIG. 3 will now be described.

When one radiation or an optical pulse 101 in a given wavelength region falls upon the scintillation fiber 301, fluorescence is produced within the scintillation fiber 301 to generate optical pulses 110a and 110b. The optical pulse 110a of the two pulses is propagated through the optical delay fiber 302 so as to launch into the photosensitive element 303. On the other hand, the remaining optical pulse 110b is directly launched into the photosensitive element 303. When a time interval, during which the optical pulses are propagated over the entire length of the optical delay fiber 302, is longer than a time interval during which the optical pulses are propagated over the entire length of the scintillation fiber 301, the optical pulse 110b is firstly introduced into the photosensitive element 303. An error in measurement, which is produced due to the fact that the time difference between the input two timing pulses is extremely small, exists in the time-to-pulse height converter 307 provided at the subsequent stage. If, however, the difference between the propagation time intervals is longer than the minimum time difference during which this error is not produced, then this error is prevented from being produced. Thereafter, the two optical pulses 110a and 110b are converted into electric pulses by the photosensitive element 303, which are in turn transmitted through the preamplifier 304 and the constant fraction discriminator 305, followed by inputting to the signal discriminating circuit 306. The signal discriminating circuit 306 causes the firstly input signal and the subsequently input signal to branch to the two and outputs them from the terminals different from each other. Thereafter, the time-to-pulse height converter 307 outputs an electric pulse having a wave or pulse height proportional to the time difference between the two signals inputted to the time-to-pulse height converter 307. Further, an analog-to-digital converter 108 converts a crest value of the analog signal into digital form, followed by inputting to a multi-channel pulse-height analyzer 109 where the signal is counted at each value thereof.

In the present embodiment as described above, since the measuring circuit system can be set as a single system unlike the prior art, an error produced due to the difference in characteristic between measuring instruments can be eliminated. Furthermore, a detector can be reduced in size.

Incidentally, a scintillation fiber shielded against radiations or light may be used as the optical delay fiber.

[Third Embodiment]

In this embodiment, a circuit of such a type that after the first signal has been inputted thereto, the second signal is allowed to pass through a path different from that used for the first signal by a switching device and after the second signal has been inputted thereto, the corresponding circuit is reset to its original condition, is constructed, as an alternative to the signal discriminating circuit 306 employed in the second embodiment. At this time, the difference in input time between the two input signals is set so as to remain unchanged.

Thus, the signal discriminating circuit 306 causes the two signals inputted from the single terminal to branch to two and is able to output them to terminals different from each other.

Figure 4A:
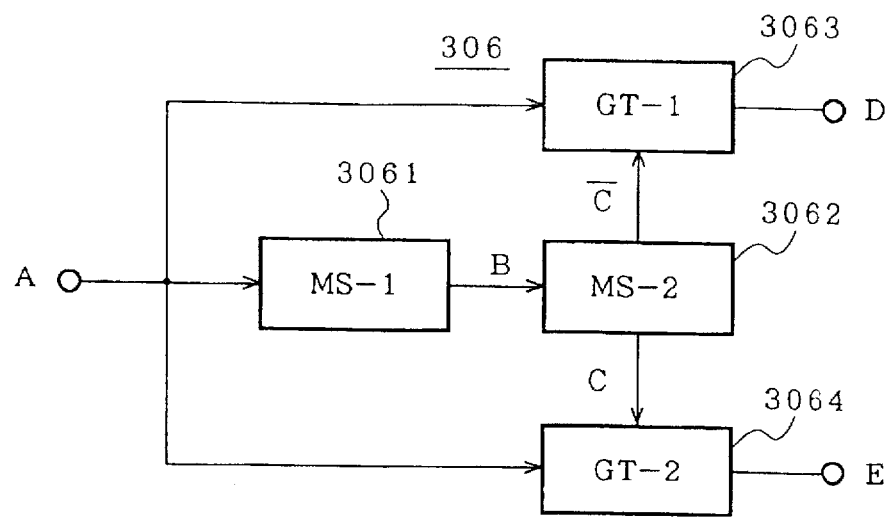
FIG. 4A is a view showing one example of a signal discriminating circuit employed in a third embodiment of the present invention.
Figure 4B:
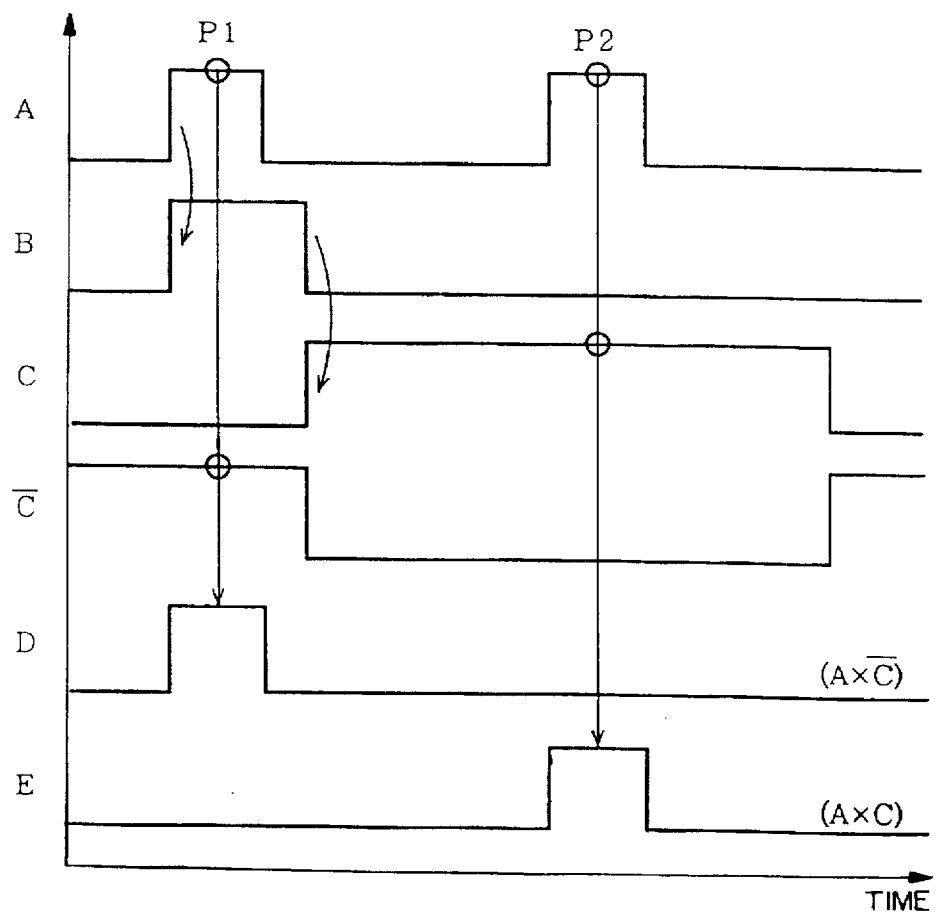
FIG. 4B is a view for describing signal waveforms obtained at respective parts of the signal discriminating circuit shown in FIG. 4A.

One example of a signal discriminating circuit used for this purpose will be shown in FIG. 4A. FIG. 4B illustrates signal waveforms obtained at respective parts of the signal discriminating circuit shown in FIG. 4A. Referring to FIGS. 4A and 4B, since an output C produced from a monostable circuit 3062 and a bar C represented by placing a bar over the output C are respectively LOW and HIGH in its initial state, a gate circuit 3063 is opened and a gate circuit 3064 is closed. Thus, a firstly input signal P1 of two input signals P1 and P2 is outputted from the gate circuit 3063. In response to the input signal P1, a monostable circuit 3061 generates an output pulse B longer in time than the input signal P1 therefrom and inverts the monostable circuit 3062 at the trailing end of the output pulse B. Thereafter, the gate circuit 3063 is closed and the gate circuit 3064 is opened during a period in which the output C and the bar C produced from the monostable circuit 3062 are being inverted. Accordingly, the input signal P2 is outputted from the gate circuit 3064. Incidentally, AND circuits may be used as an alternative to the gate circuits 3063 and 3064.

[Fourth Embodiment]

In the signal discriminating circuit 306 employed in the second embodiment, a first pulse signal and a second pulse signal are allowed to pass through paths different from each other by pulse-height discriminating circuits, using a difference in crest value between the first and second pulse signals. At this time, the difference in input time between the two input signals is set so as to remain unchanged.

Thus, the signal discriminating circuit 306 causes the two signals inputted from the single terminal to branch to two and is able to output them to terminals different from each other.

Figure 5A:
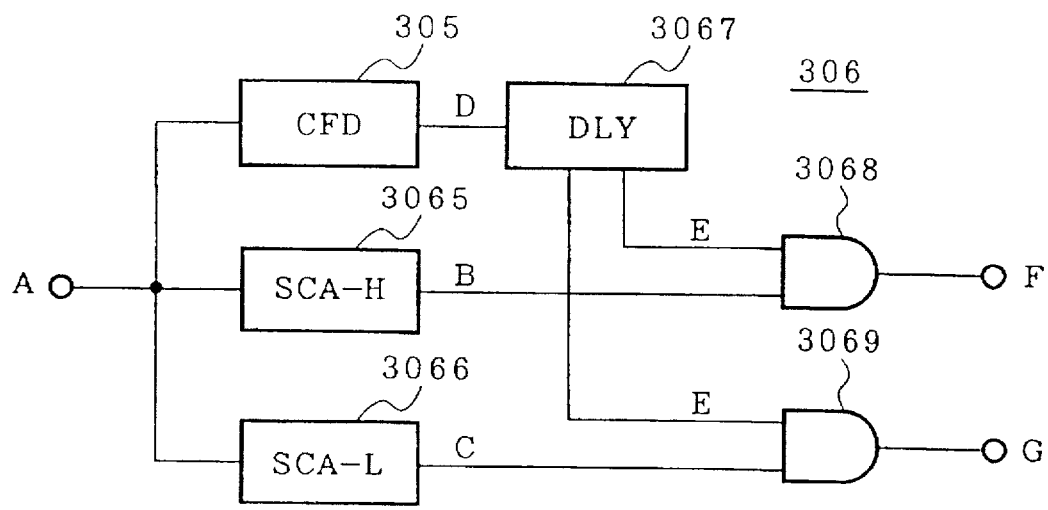
FIG. 5A is a view showing one example of a signal discriminating circuit employed in a fourth embodiment of the present invention.
Figure 5B:
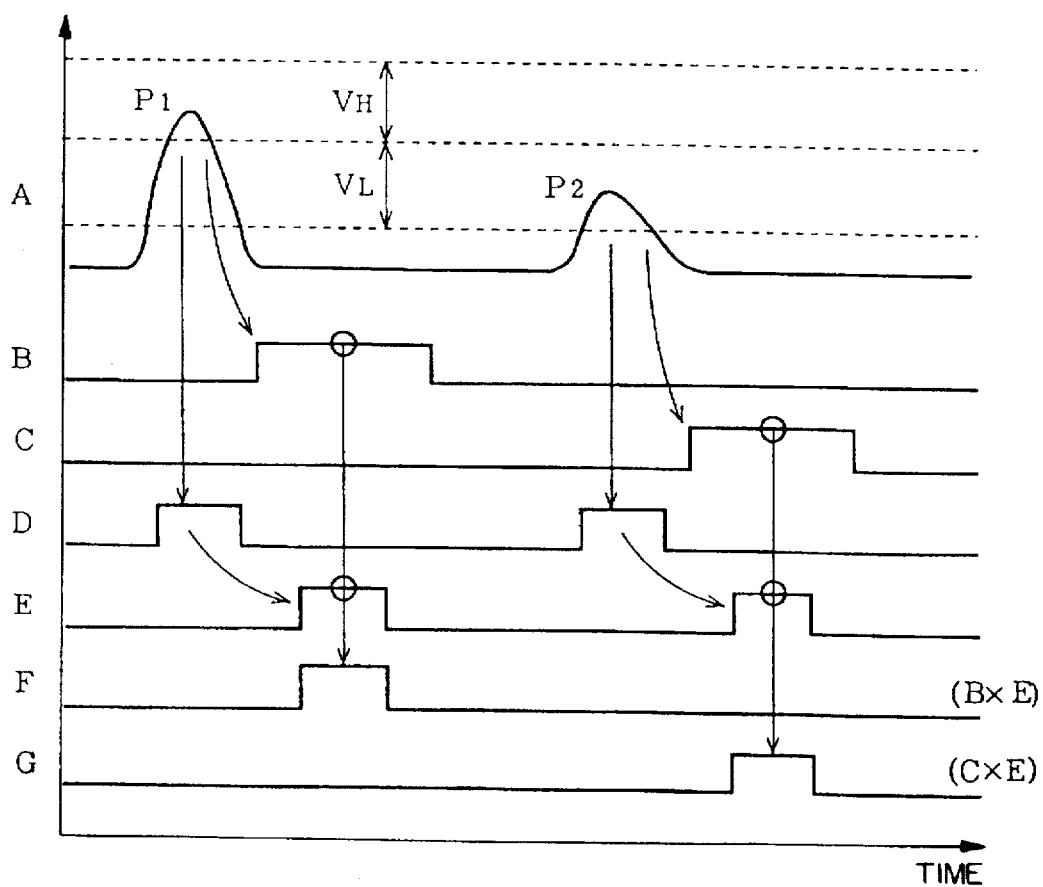
FIG. 5B is a view for describing signal waveforms obtained at respective parts of the signal discriminating circuit shown in FIG. 5A.

One example of a signal discriminating circuit used for this purpose will be shown in FIG. 5A. FIG. 5B shows signal waveforms obtained at respective parts of the signal discriminating circuit. Referring to FIGS. 5A and 5B, a single channel pulse-height analyzer (SCA-H) 3065 generates an output B based on P1 of input pulses P1 and P2 in response to a pulse having a crest-value range $V_H$. A single channel pulse-height analyzer (SCA-L) 3066 generates an output C based on the input signal P2 in response to a pulse of a crest-value range $V_L$. Since the pulses B and C are used for pulse discrimination but the signals outputted from the single channel pulse-height analyzers are generated with being delayed with respect to the input signal, an output D produced from a constant fraction discriminator 305 is delayed by a delay circuit 3067 so as to be timed to the above delays, thereby producing an output E. An AND circuit 3068 selects the P1 (delay) timed with the SCA-H 3065 and generates an output signal F therefrom based on the P1. An AND circuit 3069 selects the P2 (delay) and generates an output signal G therefrom based on the P2. Thus, the AND circuit 3068 outputs the timing signal corresponding to the input signal having the crest-value range $V_H$, whereas the AND circuit 3069 outputs the timing signal corresponding to the input signal having the crest-value range $V_L$.

[Fifth Embodiment]

Figure 6A:
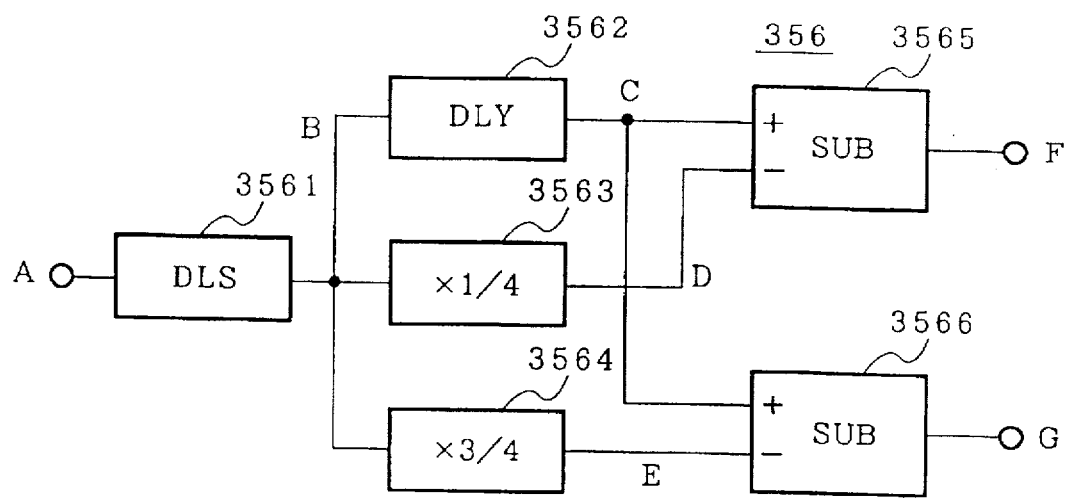
FIG. 6A is a view illustrating one example of a signal discriminating circuit employed in a fifth embodiment of the present invention.
Figure 6B:
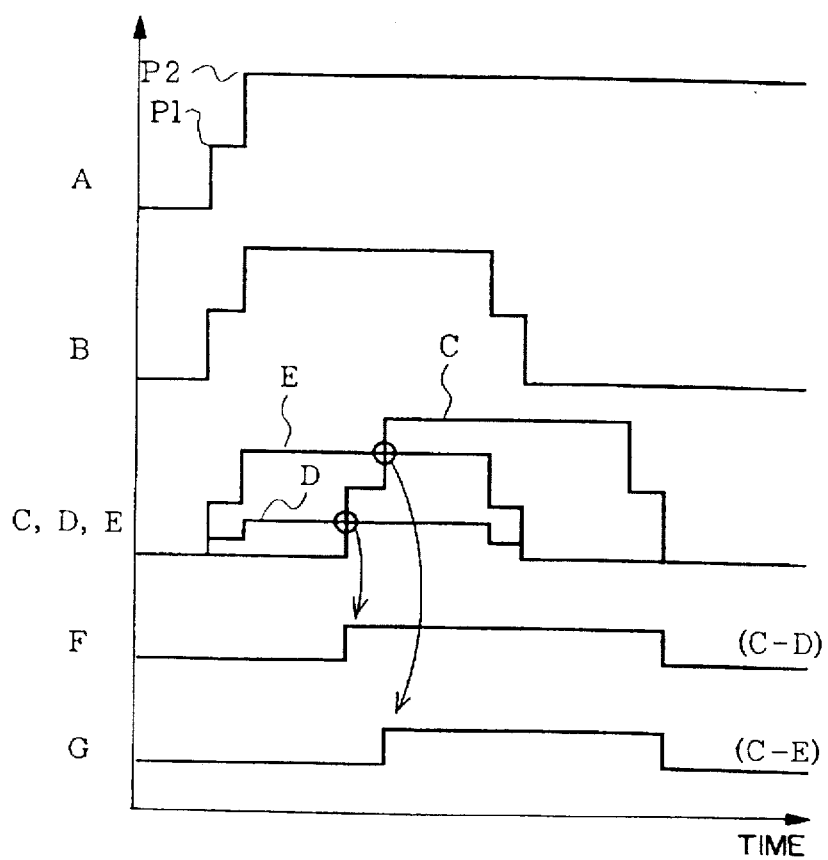
FIG. 6B is a view for describing signal waveforms obtained at respective parts of the signal discriminating circuit shown in FIG. 6A.

FIG. 6A shows another example of the signal discriminating circuit 306 employed in the second embodiment. FIG. 6B illustrates signal waveforms obtained at individual parts of the signal discriminating circuit 306. A signal discriminating circuit 356 employed in the present embodiment doubles the functions of the constant fraction discriminator 305 and the signal discriminating circuit 306 employed in the second embodiment. Since two pulses for measuring a time difference must be separated from one another in terms of time when the two pulses pass through the same path, the time difference between$⁻ the pulses, which is close to within a respective pulse width, cannot be measured. The signal discriminating circuit employed in the present embodiment can overcome such inconvenience and generates output pulses corresponding to individual times of overlapping two pulses at separate output terminals. A delay line shaping circuit 3561 shapes a signal having a stepped waveform, which is outputted from a preamplifier, into a rectangular wave. When the two input signals P1 and P2 are close to each other, the delay line shaping circuit 3561 outputs a rectangular wave B obtained by overlaying the signals on one another. Signals outputted from a delay circuit 3562 and a ¼ attenuator 3563 are supplied to a subtracter 3565 wher$Na timing signal corresponding to the first pulse P1 is generated. On the other hand, a ¾ attenuator 3564 supplies an output signal to a subtracter 3566 from which a timing signal corresponding to the second pulse P2 is generated. Thus, even when the time difference between the two input signals is smaller than each pulse width, the signal discriminating circuit 356 can output the timing signals from the two different output terminals. If a delay time of the delay circuit 3562 is selected to half the width of the pulse outputted from the delay line shaping circuit 3561, then a measurable time-difference range can be maximized.

[Six Embodiment]

FIG. 7 is a configurational view showing a main part of a distribution type detector according to a sixth embodiment of the present invention. In FIG. 7, reference numerals 401, 402, 403 and 404 indicate a scintillation fiber, an optical delay fiber, a reflector and a photosensitive element respectively.

The operation of the present embodiment will now be described.

When one radiation or an optical pulse 101 in a given wavelength region falls on the scintillation fiber 401, fluorescence is produced within the scintillation fiber 401 to generate optical pulses 110a and 110b. The optical pulse 110a of the two is propagated through the optical delay fiber 402 and is reflected from the reflector 403 provided at the end of the optical delay fiber 402 so as to enter into the photosensitive element 404. On the other hand, the remaining optical pulse 110b directly enters the photosensitive element 404. An error in measurement, which is produced due to the fact that the time difference between the input two timing pulses is extremely small, exists in a time-to-pulse height converter provided at the subsequent stage. If, however, the time difference between the two optical pulses inputted to the photosensitive element 404 is greater than the minimum time difference during which this error is not produced, then this error is prevented from being produced. To prevent the occurrence of the error, the length of the optical delay fiber 402 is set to such a length that a time interval required to move the optical pulse forward and backward alternately becomes longer than the minimum time during which no error is produced. Measuring circuits provided subsequent to the photosensitive element 404 may be similar to those employed in the second embodiment.

When the length of the scintillation fiber 401 is made long under the above construction, the maximum time difference between the two optical pulses 110a and 110b inputted to the photosensitive element 404 becomes large. However, the use of the above-described optical delay fiber as an alternative to the conventional signal delay circuit makes it unnecessary to increase the length of the optical delay fiber 402. Namely, it is unnecessary to increase a delay time. Thus, a time-difference range of the time-to-pulse height converter can be kept low in a manner similar to the first embodiment, thereby making it possible to improve position resolution for position detection as compared with the prior art.

In the present embodiment, since a measuring circuit system can be set as a single system unlike the prior art, an error produced due to the difference in characteristic between measuring instruments can be eliminated. Furthermore, a detector can be reduced in size.

The reflector 403 employed in the six embodiment may be constructed such that an end face of the optical delay fiber 402 is flatly ground and a flat reflective material is stuck to the end face thereof with silicon adhesive or the like.

Thus, the loss of light incurred at reflecting surface of the reflector 403 can be reduced.

A hole may be defined in the leading end of a core of the optical delay fiber 402 by etching so that the reflector 403 employed in the sixth embodiment is embedded therein.

Thus, the loss of light incurred at the reflecting surface of the reflector 403 can be reduced in the same manner as described above.

[Seventh Embodiment]

Figure 8:
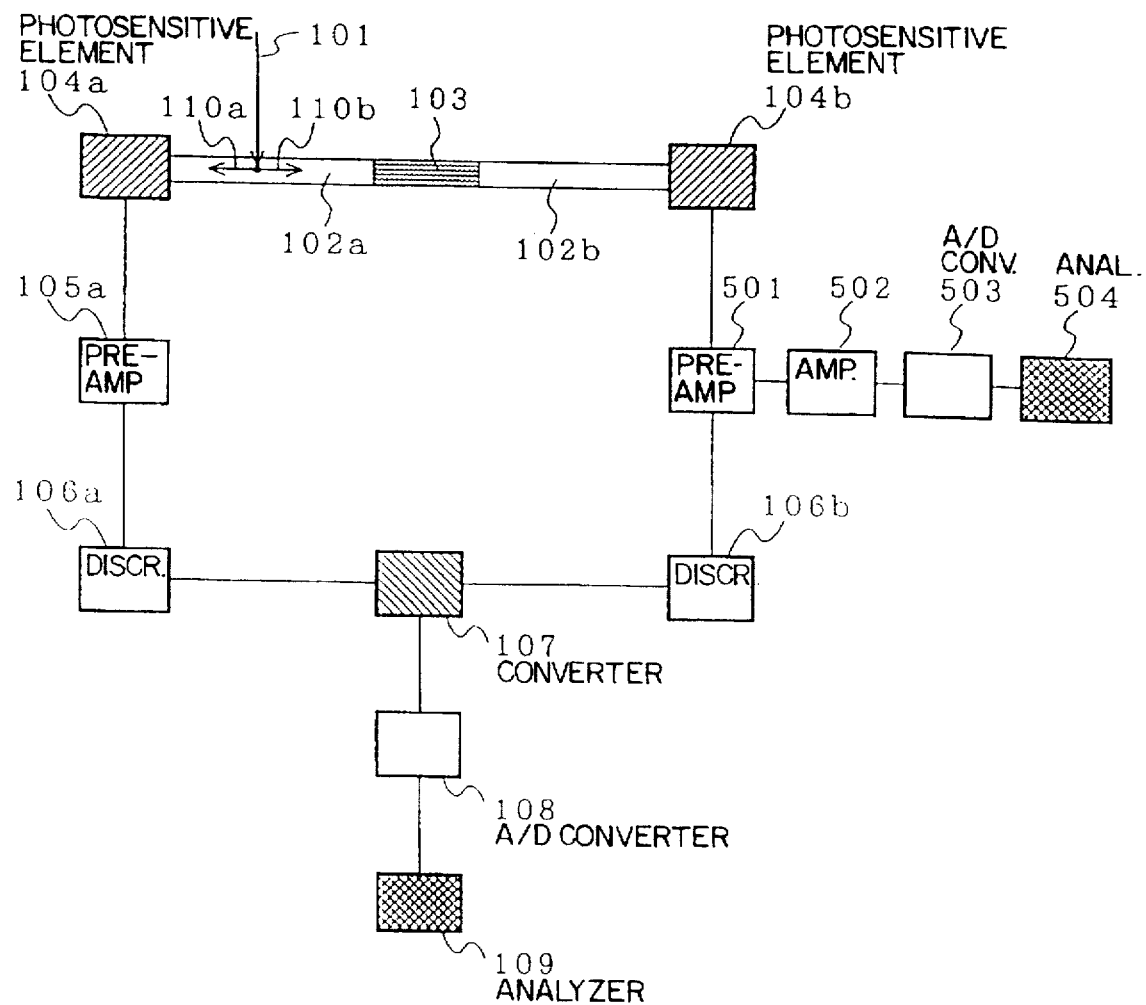
FIG. 8 is an overall schematic view illustrating a seventh embodiment of the present invention.

FIG. 8 is a configurational view illustrating a distribution type detector according to seventh embodiment of the present invention and is also a view showing the structure of a device for measuring an energy spectrum of a radiation or an optical pulse in a given wavelength region as well as a position where the radiation or the optical pulse in the given wavelength region employed in the first embodiment is entered. In FIG. 8, reference numeral 501 indicates a preamplifier for outputting two signals in response to a single input signal. Reference numeral 502 indicates an amplifier. Reference numeral 503 indicates an analog-to-digital converter. Reference numeral 504 indicates a multichannel pulse-height analyzer.

The operation of the distribution type detector shown in FIG. 8 will now be described.

An electric pulse outputted from a photosensitive element 104b is inputted to the preamplifier 501 from which the two signals are outputted. One of the two signals is supplied to a constant fraction discriminator 106b. The subsequent operation is performed in a manner similar to the first embodiment. The other of the two signals is inputted to the amplifier 502 where the signal is further amplified. The amplified signal is inputted to the analog-to-digital converter 503, followed by inputting to the multichannel pulse-height analyzer 504.

A crest value of a pulse counted by the multichannel pulse-height analyzer 504 is substantially proportional to the energy of a radiation or an optical pulse 101 in a given wavelength region, which enters into each scintillation fiber. Thus, the energy spectrum of the radiation or the optical pulse 101 in the given wavelength region, which has entered each scintillation fiber, can be measured by discriminating between the input signals according to the crest value by the multichannel pulse-height analyzer 504. In the present embodiment, the energy signal is taken out from the one side of the preamplifier alone. Alternatively, the energy signal may be taken out from the preamplifier 105a side so as to measure an energy spectrum based on the sum of both signals. In doing so, an advantage can be brought about which is capable of reducing a dependence on the incident position of a radiation or an optical pulse in a given wavelength region.

As an alternative to an analog-to-digital converter 108 and the analog-to-digital converter 503 both employed in the seventh embodiment, a multiparameter type analog-to-digital converter may be used so as to supplement the functions of these two analog-to-digital converters in the form of one function. Such a construction enables the provision of a single multichannel pulse-height analyzer so that the same effects as those obtained in the seventh embodiment can be achieved and the measuring circuit can be made compact in size.

[Eighth Embodiment]

Figure 9:
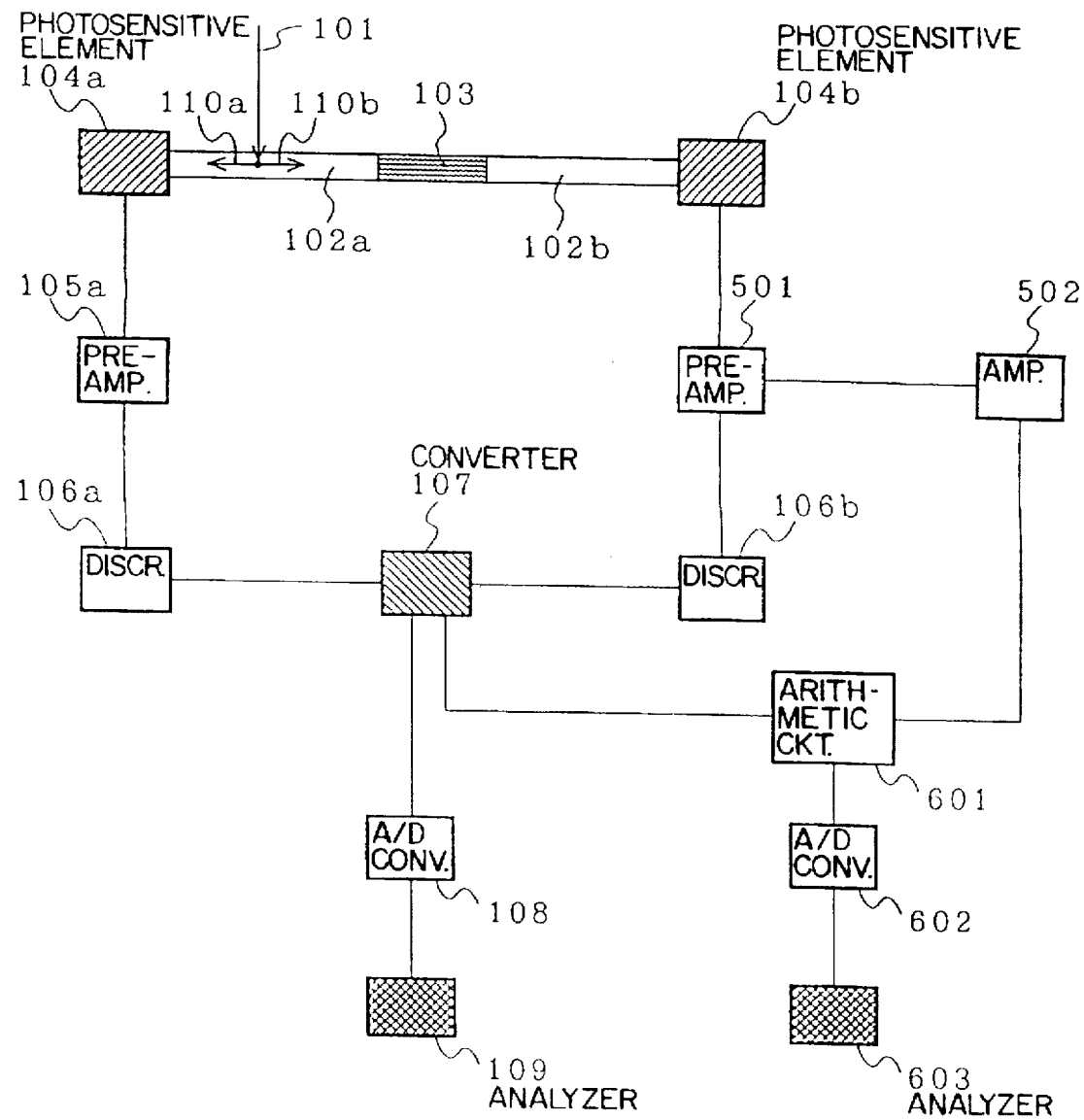
FIG. 9 is an overall schematic view depicting an eighth embodiment of the present invention.

FIG. 9 is a configurational view showing a distribution type detector according to an eighth embodiment of the present invention and is also a view showing the structure of a device for measuring an energy spectrum of a radiation or an optical pulse in a given wavelength region as well as a position where the radiation or the optical pulse in the given wavelength region employed in the first embodiment is entered. Upon measurement of the distribution of energy, this device can also compensate for dependence on the position where the radiation or the optical pulse in the given wavelength region is entered, on a hardware basis. In FIG. 9, reference numeral 601 indicates an arithmetic circuit for compensating for the dependence on the above incident position. This arithmetic circuit includes a coincidence circuit. Reference numeral 602 indicates an analog-to-digital converter and reference numeral 603 indicates a multichannel pulse-height analyzer.

The operation of the distribution type detector shown in FIG. 9 will now be described.

An electric pulse outputted from a photosensitive element 104b is inputted to a preamplifier 501 from which two signals are outputted. One of the two signals is inputted to a constant fraction discriminator 106b. The subsequent operation is performed in a manner similar to the first embodiment. The other of the two signals is inputted to an amplifier 502 where the signal is further amplified. When, however, scintillation fibers 102a and 102b or an optical delay fiber 103 is so long in length, the crest value of the signal greatly varies depending on at which position of the scintillation fiber 102a or 102b the radiation or the optical pulse in the given wavelength region enters, even if the energy of the radiation or the optical pulse is kept constant. This is because the optical pulses generated by fluorescence suffer losses when propagated through the scintillation fibers and the optical delay fiber. To compensate for the losses, the degree or level of a loss relative to a distance over which each optical pulse produced by fluorescence is propagated within its corresponding fiber, is measured in advance and a distance to be propagated through the corresponding fiber is measured according to the incident position of the radiation or the optical pulse in the given wavelength region upon actual measurement. Thereafter, the crest value of each propagated optical pulse may be compensated based on the value of the propagated distance. The arithmetic circuit 601 is provided to compensate for the crest value thereof. The arithmetic circuit 601 is supplied with a signal outputted from an amplifier 502 and a signal outputted from a time-to-pulse height converter 107. The coincidence circuit included in the arithmetic circuit 601 starts arithmetic computations after the two signals have been inputted thereto. Namely, the arithmetic circuit 601 calculates the propagated distance of the optical pulse based on the signal outputted from the time-to-pulse height converter 107 and compensates for the crest value of the signal outputted from the amplifier 502. Further, the arithmetic circuit 601 outputs the compensated signal to the analog-to-digital converter 602. After the signal has been supplied to the analog-to-digital converter 602, it is inputted to the multichannel pulse-height analyzer 603.

The crest value of the pulse, which is counted by the multichannel pulse-height analyzer 603, is substantially proportional to the energy of a radiation or an optical pulse 101 in a given wavelength region, which falls on each scintillation fiber. Thus, an energy spectrum of the radiation or the optical pulse 101 in the given wavelength region, which has entered into its corresponding scintillation fiber, can be measured by discriminating between the input signals according to the crest value with the multichannel pulse-height analyzer 603.

[Ninth Embodiment]

Figure 10:
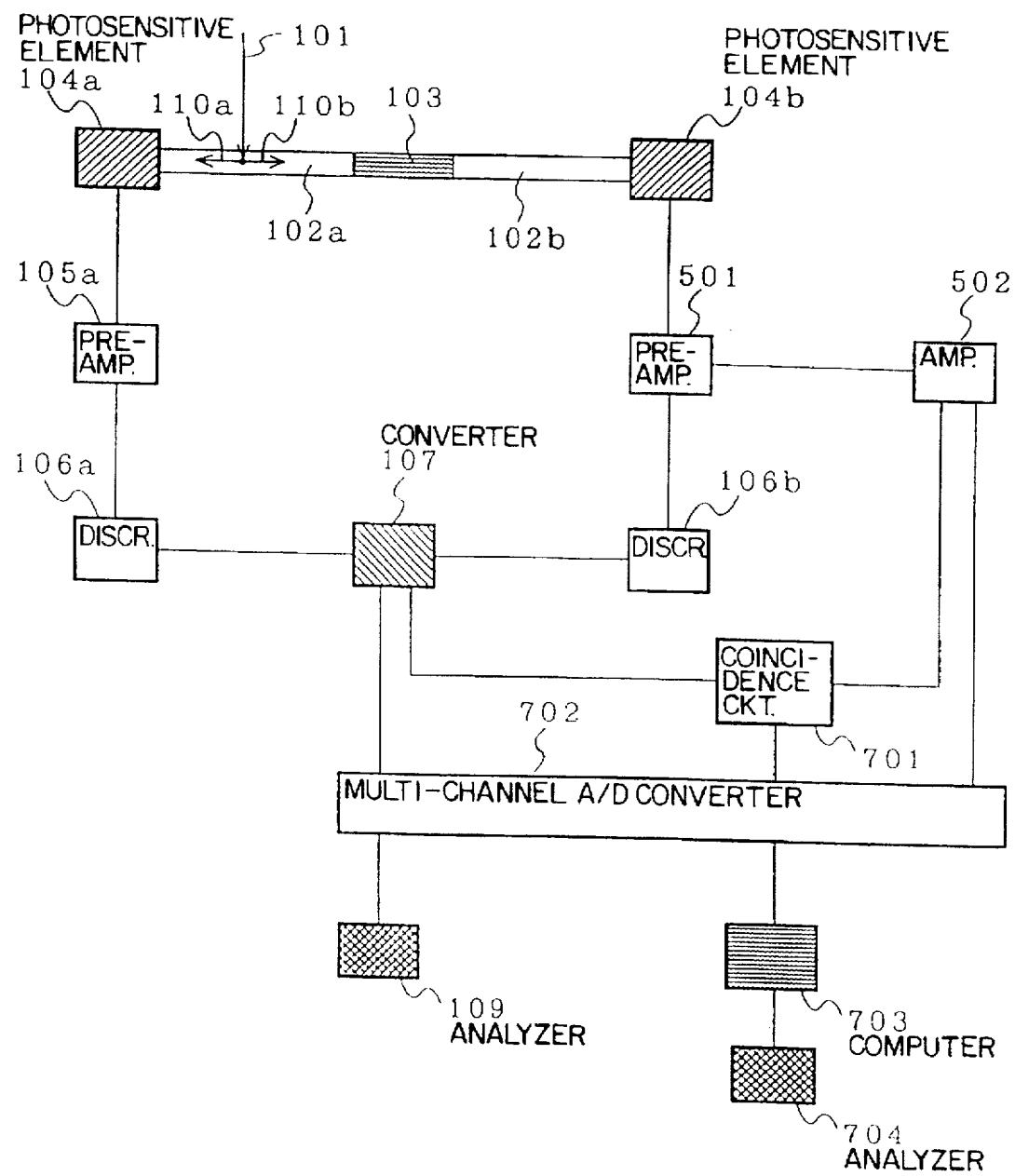
FIG. 10 is an overall schematic view showing a ninth embodiment of the present invention.

FIG. 10 is a configurational view illustrating a distribution type detector according to a ninth embodiment of the present invention and is also a view showing the structure of a device for measuring an energy spectrum of a radiation or an optical pulse in a given wavelength region as well as a position where the radiation or the optical pulse in the given wavelength region employed in the first embodiment is entered. Upon measurement of the distribution of energy, this device can also compensate for dependence on the position where the radiation or the optical pulse in the given wavelength region is entered, on a software basis. In FIG. 10, reference numeral 701 indicates a coincidence circuit. Reference numeral 702 indicates a multichannel type analog-to-digital converter which starts to operate after having been supplied with an external trigger. Reference numeral 703 indicates a computer such as a personal computer and reference numeral 704 indicates a multichannel pulse-height analyzer.

The operation of the detector shown in FIG. 10 will now be described.

An electric pulse outputted from a photosensitive element 104b is inputted to a preamplifier 501 from which two signals are outputted. One of the two signals is inputted to a constant fraction discriminator 106b. The subsequent operation is performed in a manner similar to the first embodiment. The other of the two signals is inputted to an amplifier 502 where the signal is further amplified. Each optical pulse can be more accurately measured by compensating for the crest value of each of the optical pulses produced by fluorescence within the scintillation fiber 102a and 102b as described in the eighth embodiment. To compensate for it, the degree or level of a loss relative to a distance over which each optical pulse produced by fluorescence is propagated within its corresponding fiber, is measured in advance and a distance to be propagated through the corresponding fiber is measured according to the incident position of the radiation or the optical pulse in the given wavelength region upon actual measurement. Thereafter, the crest value of each propagated optical pulse may be compensated based on the value of the propagated distance. When two signals corresponding to a signal outputted from the amplifier 502 and a signal outputted from a time-to-pulse height converter 107 are inputted to the coincidence circuit 701 during a predetermined time, the coincidence circuit 701 outputs a signal to a gate input terminal of the analog-to-digital converter 702. Further, a signal outputted from the amplifier 502 and a signal outputted from the time-to-pulse height converter 107 are converted into digital form by the analog-to-digital converter 702. Next, the computer 703 receives the two signals. The signal obtained by converting the signal outputted from the time-to-pulse height converter 107 into digital form is also inputted to a multichannel pulse-height analyzer 109. The computer 703 compensates for the crest value of the signal outputted from the amplifier 502 based on the two signals inputted thereto in the same manner as described in the eighth embodiment. The computer 703 outputs the compensated value to the multichannel pulse-height analyzer 704 as a signal.

The crest value of the pulse, which is counted by the multichannel pulse-height analyzer 704, is substantially proportional to the energy of a radiation or an optical pulse 101 in a given wavelength region, which falls on each scintillation fiber. Thus, an energy spectrum of the radiation or the optical pulse 101 in the given wavelength region, which has entered into its corresponding scintillation fiber, can be measured by discriminating between the input signals according to the crest value with the multichannel pulse-height analyzer 704.

[Tenth Embodiment]

Figure 11:
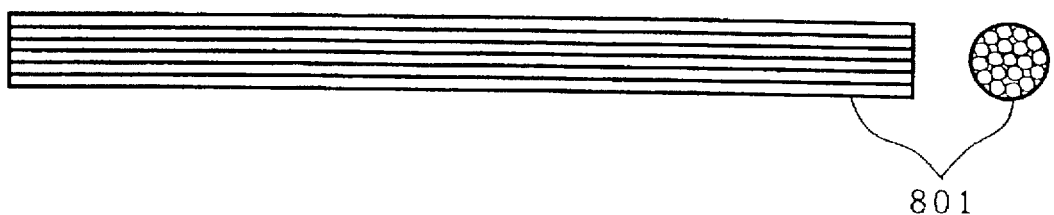
FIG. 11 is a side and sectional view of a bundle of scintillation fibers for describing a tenth embodiment of the present invention.

FIG. 11 is a configurational view showing a scintillation fiber according to a tenth embodiment of the present invention. In FIG. 11, reference numeral 801 indicates a scintillation fiber bundle obtained by forming a plurality of scintillation fibers into one with fusing bonding, adhesion or the like. A drawing on the right side of FIG. 11 is a cross-sectional view of the bundle. A cross-section of the single scintillation fiber at this time shows a circle. Optical pulses generated by the scintillation fiber bundle 801 are received by one photosensitive element attached to an end face of the scintillation fiber bundle 801 or an optical delay fiber or by two photosensitive elements attached to end faces thereof.

The operation will now be described.

The formation of the plurality of scintillation fibers into one scintillation fiber bundle as shown in FIG. 11 enables the expansion of a range in which a radiation or an optical pulse in a given wavelength region, which enters into the scintillation fiber bundle, interacts with the scintillation fiber bundle. Namely, the probability of the interaction of the radiation or the optical pulse with the scintillation fiber bundle increases and the number of optical pulses produced when one radiation or an optical pulse in a given wavelength region enters, becomes greater, with the result that the quantity of light received by the photosensitive element can be increased. It is therefore possible to raise the sensitivity of a detector. Further, the optical pulses generated by the scintillation fiber bundle 801 are received by the one or two photosensitive elements attached to the end faces of the scintillation fiber bundle 801 or the optical delay fiber.

[Eleventh Embodiment]

Figure 12:
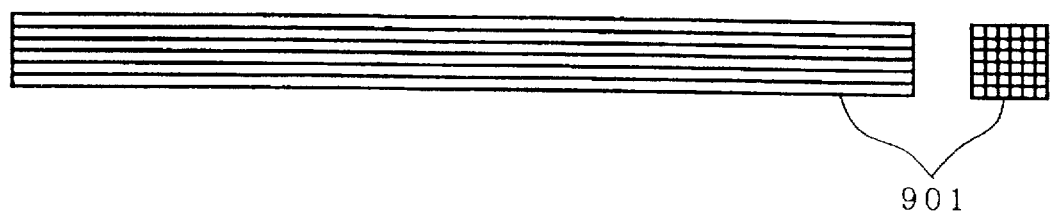
FIG. 12 is a side and sectional view of a bundle of scintillation fibers for describing an eleventh embodiment of the present invention.

FIG. 12 is a configurational view showing a scintillation fiber according to an eleventh embodiment of the present invention. In FIG. 12, reference numeral 901 indicates a scintillation fiber bundle obtained by forming a plurality of scintillation fibers each quadrangular in section into one by fusion bonding or the like. A drawing on the right side of FIG. 12 corresponds to a cross-sectional view of the scintillation fiber bundle. Further, optical pulses generated by the scintillation fiber bundle 901 are received by one photosensitive element attached to an end face of the scintillation fiber bundle 901 or an optical delay fiber or by two photosensitive elements attached to end faces of the scintillation fiber bundle 901 or the optical delay fiber. According to this invention, the same operations and effects as those obtained in the tenth embodiment can be brought about.

[Twelfth Embodiment]

Figure 13:
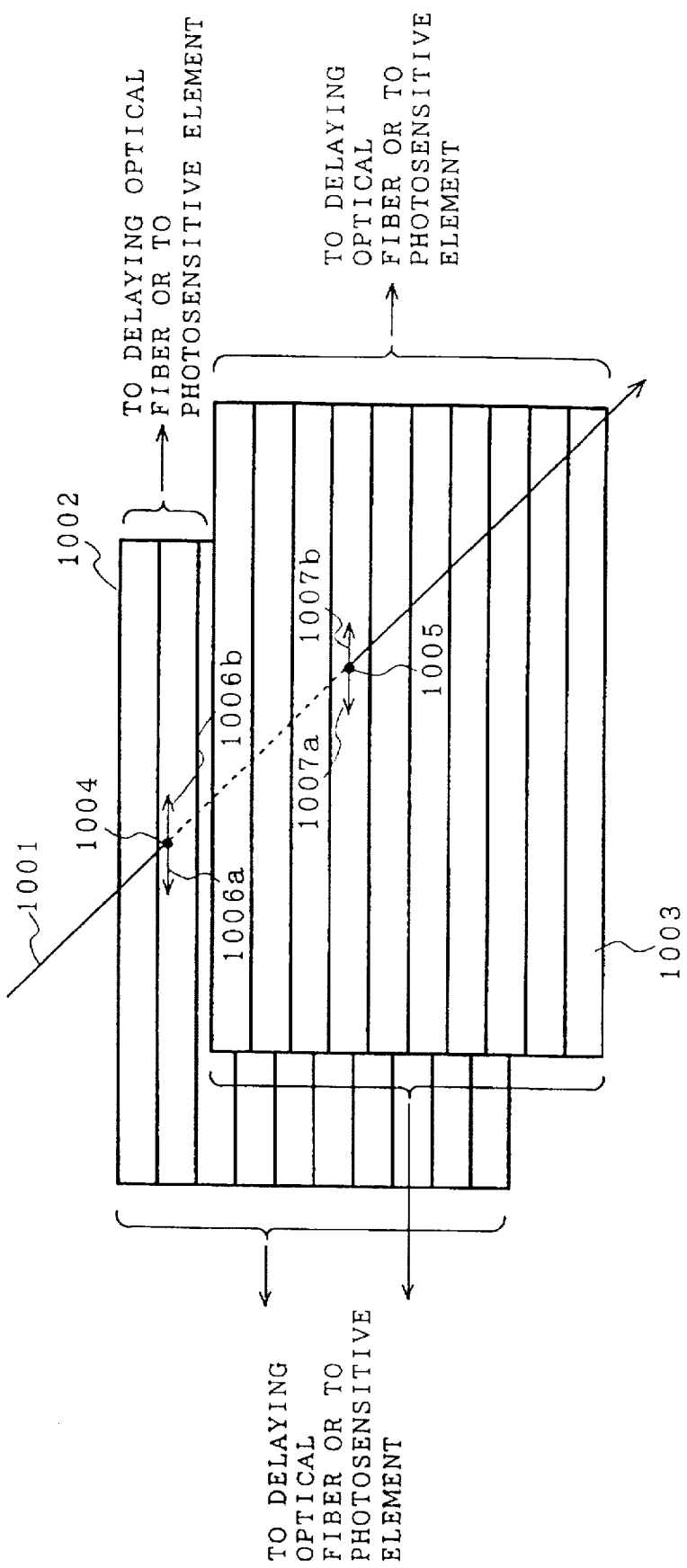
FIG. 13 is a layout schematic view of scintillation fiber plates for describing a twelfth embodiment of the present invention.

FIG. 13 is a configurational view showing fiber plates according to a twelfth embodiment of the present invention. In FIG. 13, reference numeral 1001 indicates a radiation or an optical pulse in a given wavelength region. Reference numerals 1002 and 1003 respectively indicate fiber plates each formed by joining scintillation fibers to one another in the form of a plate. Reference numerals 1004 and 1005 indicate fluorescent points respectively. Reference numerals 1006a, 1006b, 1007a and 1007b respectively indicate optical pulses generated by fluorescence. Further, optical delay fibers or photosensitive elements are attached to end faces of each of the fiber plates 1002 and 1003 so that information can be obtained from individual scintillation fibers.

The operation will now be described.

In the aforementioned tenth and eleventh embodiments, the scintillation fibers are shaped in the form of the bundle. In the present invention, however, the scintillation fibers are shaped in plate form by fusion bonding, adhesion or the like without forming them into the single bundle and the two fiber plates 1002 and 1003 are arranged in parallel with each other as shown in FIG. 13. When several radiations or optical pulses in a given wavelength region enters in the form of a locus as shown in FIG. 13, fluorescence is produced at the fluorescent point 1004 or 1005 in the fiber plate 1002 or 1003. Thus, the optical pulses 1006a, 1006b, 1007a and 1007b are generated and propagated so as to reach both ends of the respective scintillation fibers. By receiving the optical pulses 1006a, 1006b, 1007a and 1007b with the photosensitive elements disposed on their corresponding extensions of the scintillation fibers that give rise to fluorescence, each position where the radiations or the optical pulses in the given wavelength region on the fiber plates 1002 and 1003 enters, can be two-dimensionally determined. Further, tracks of the radiations or the optical pulses in the given wavelength region can be understood from the information obtained from the two fiber plates.

[Thirteenth Embodiment]

Figure 14:
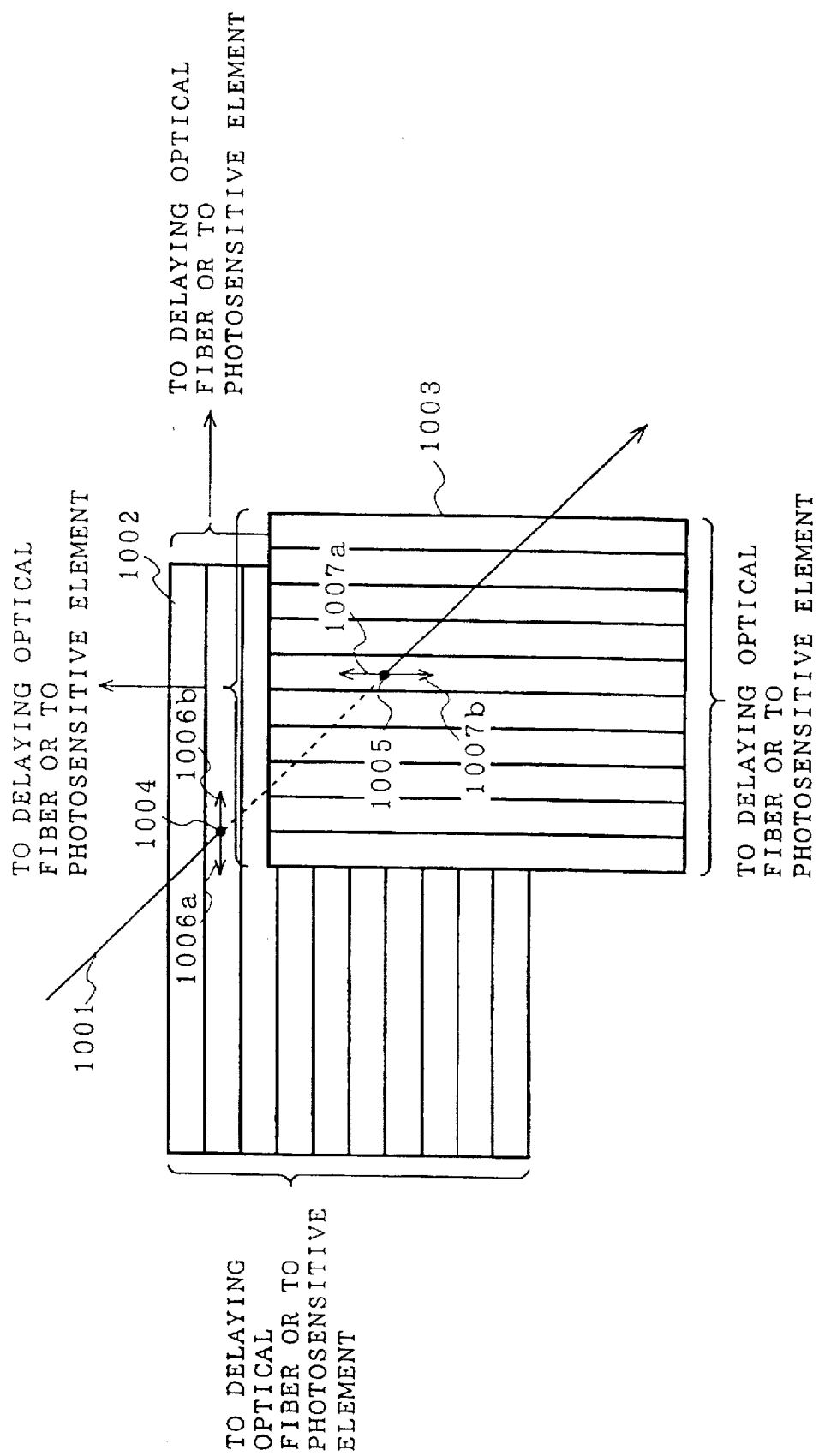
FIG. 14 is a layout schematic view of scintillation fiber plates for illustrating a thirteenth embodiment of the present invention.

FIG. 14 is a configurational view showing fiber plates according to a thirteenth embodiment of the present invention. Elements of structure shown in FIG. 14 are identical to those employed in the twelfth embodiment. However, a fiber plate 1003 is provided so as to be rotated through 90 degrees with respect to FIG. 13. Further, optical delay fibers or photosensitive elements are attached to both ends of the respective fiber plates 1002 and 1003 so that information can be brought about from individual scintillation fibers. Even if they are disposed in the above-described manner, effects are identical to those obtained in the twelfth embodiment. In the present embodiment, the photosensitive elements may be connected to individual scintillation fibers of each fiber plate. However, even if the fiber plates 1002 and 1003 are closely disposed and the respective photosensitive elements are connected to both ends of each fiber plate so as to take out only position information in the longitudinal direction of the fibers of each fiber plate, two-dimensional position information can be obtained by the fiber plates 1002 and 1003 orthogonal to each other. Further, track information can be also obtained by providing the two intersecting fiber plates in the form of two sets.

[Fourteenth Embodiment]

Figure 15:
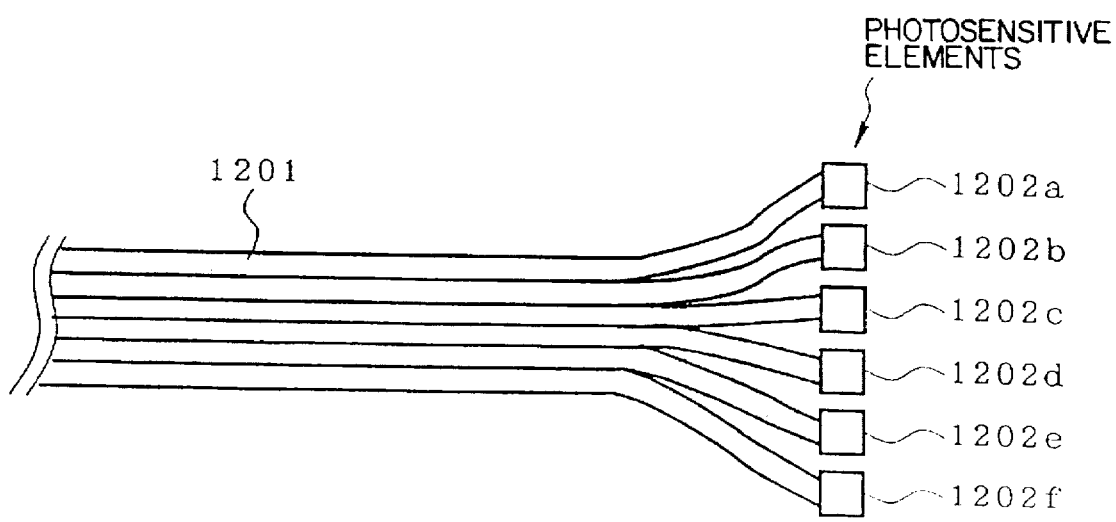
FIG. 15 is a partial schematic view showing a fourteenth embodiment of the present invention.

FIG. 15 illustrates an embodiment in which photosensitive elements are attached to the scintillation fibers or the optical delay fibers employed in the twelfth and thirteenth embodiments. In FIG. 15, reference numeral 1201 indicates a fiber plate obtained by shaping scintillation fibers in the form of a plate or an optical delay fiber group (optical delay fibers may not be shaped in the form of a plate). Reference symbols 1202a through 1202f indicate photosensitive elements respectively. The fibers of the fiber plate 1201 are in one-to-one correspondence with the photosensitive elements. The mating faces between the fibers and the photosensitive elements are joined to one another with silicon adhesives or connectors or the like. It is thus possible to obtain information from the individual scintillation fibers.

[Fifteenth Embodiment]

Figure 16:
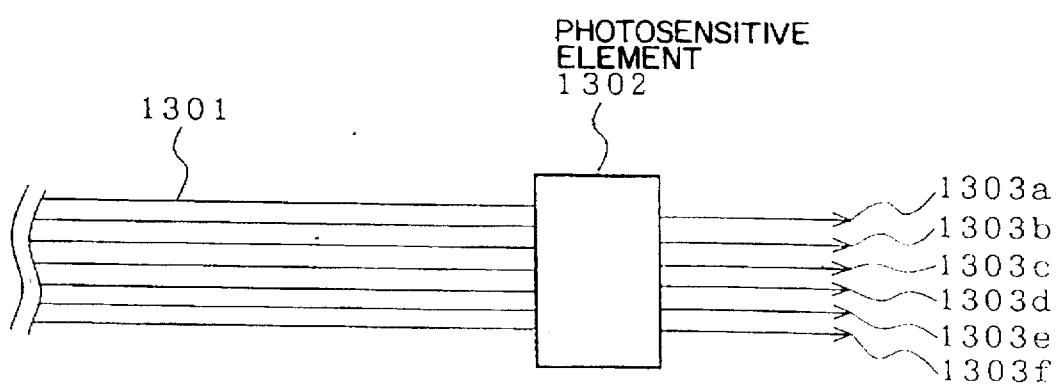
FIG. 16 is a partial schematic view illustrating a fifteenth embodiment of the present invention.

FIG. 16 shows an embodiment in which a photosensitive element is attached to the scintillation fibers or the optical delay fibers employed in the twelfth and thirteenth embodiments. In FIG. 16, reference numeral 1301 indicates a fiber plate obtained by shaping scintillation fibers in the form of a plate or an optical delay fiber group (optical delay fibers may not be shaped in the form of a plate). Reference numeral 1302 indicates a photosensitive element. Reference symbols 1303a through 1303f respectively indicate electric signals outputted from the photosensitive element 1302.

The photosensitive element 1302 is of the multianode type. The fibers are in one-to-one correspondence with anodes of the photosensitive element 1302. Thus, the outputs 1303a through 1303f produced from the photosensitive element 1302 match with their corresponding fibers. The mating faces between the fibers and the photosensitive element are joined to one another with silicon adhesive or connectors or the like.

Thus, information can be obtained from the individual scintillation fibers.

[Sixteenth Embodiment]

Figure 17:
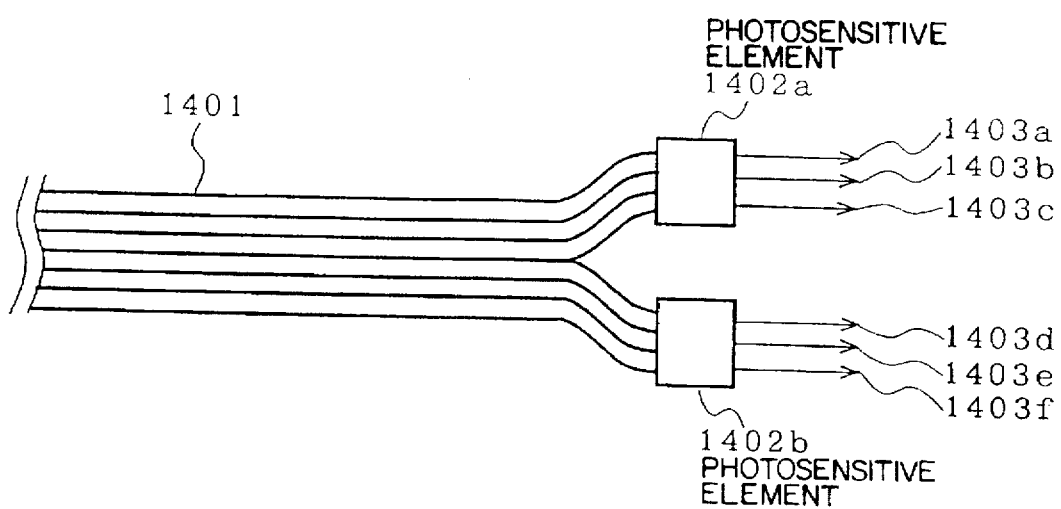
FIG. 17 is a partial schematic view depicting a sixteenth embodiment of the present invention.

FIG. 17 illustrates an embodiment in which photosensitive elements are mounted to the scintillation fibers or the optical delay fibers employed in the twelfth and thirteenth embodiments. In FIG. 17, reference numeral 1401 indicates a fiber plate obtained by shaping scintillation fibers in the form of a plate or an optical delay fiber group (optical delay fibers may not be shaped in the form of a plate). Reference symbols 1402a and 1402b indicate photosensitive elements respectively. Reference symbols 1403a through 1403f respectively indicate electric signals outputted from the photosensitive elements 1402a and 1402b.

Each of the photosensitive elements 1402a and 1402b is of the multianode type. The fibers are in one-to-one correspondence with anodes of the photosensitive elements. Thus, the outputs 1403a through 1403f produced from the photosensitive elements 1402a and 1402b match with their corresponding fibers. The mating faces between the fibers and the photosensitive elements are joined to each other with silicon adhesives or connectors or the like.

Thus, information can be obtained from the individual scintillation fibers. The configuration shown in FIG. 17 is substantially similar to that shown in FIG. 16. If, however, the number of the fibers is greater than the number of the anodes of the photosensitive elements, then the configuration shown in FIG. 17 may be adopted.

[Seventeenth Embodiment]

Figure 18:
FIG. 18 is a partial schematic view showing a seventeenth embodiment of the present invention.

FIG. 18 is a configurational view showing a seventeenth embodiment of the present invention. The present embodiment shows, as an illustrative example, a case where the optical delay fibers employed in the tenth through sixteenth embodiments are attached to the scintillation fibers. In FIG. 18, reference numeral 1501 indicates a combination obtained by joining optical delay fibers identical in diameter and number to scintillation fibers to one another in the form of a bundle or a plate with fusion bonding or the like. Reference numeral 1502 indicates a combination obtained by joining scintillation fibers to one another in the form of a bundle or a plate. At the mating face between the two combinations, the scintillation fibers are in one-to-one correspondence with the optical delay fibers and the two combinations are joined to one another with a silicon adhesive or the like. Thus, the loss of light at the mating face therebetween can be reduced.

[Eighteenth Embodiment]

Figure 19:
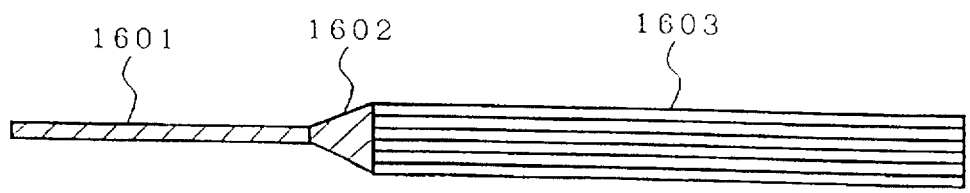
FIG. 19 is a partial schematic view illustrating an eighteenth embodiment of the present invention.

FIG. 19 is a configurational view showing an eighteenth embodiment of the present invention. The present embodiment shows, as an illustrative example, a case where the optical delay fiber employed in each of the tenth and eleventh embodiments is attached to scintillation fibers. In FIG. 19, reference numeral 1601 indicates a single optical delay fiber. Reference numeral 1602 indicates a light guide of acrylic, for example. Reference numeral 1603 indicates a scintillation fiber bundle obtained by joining scintillation fibers to one another in the form of a bundle. At the mating face between the optical delay fiber and the optical guide, and between the scintillation fiber bundle and the optical guide, they are bonded to one another with fusion or silicon adhesives or the like.

Thus, the light can be efficiently propagated through the scintillation fiber bundle and the optical delay fiber.

In the case where the optical delay fiber is used in plural form in the eighteenth embodiment, the same effects as described above can also be obtained.

[Nineteenth Embodiment]

Figure 20:
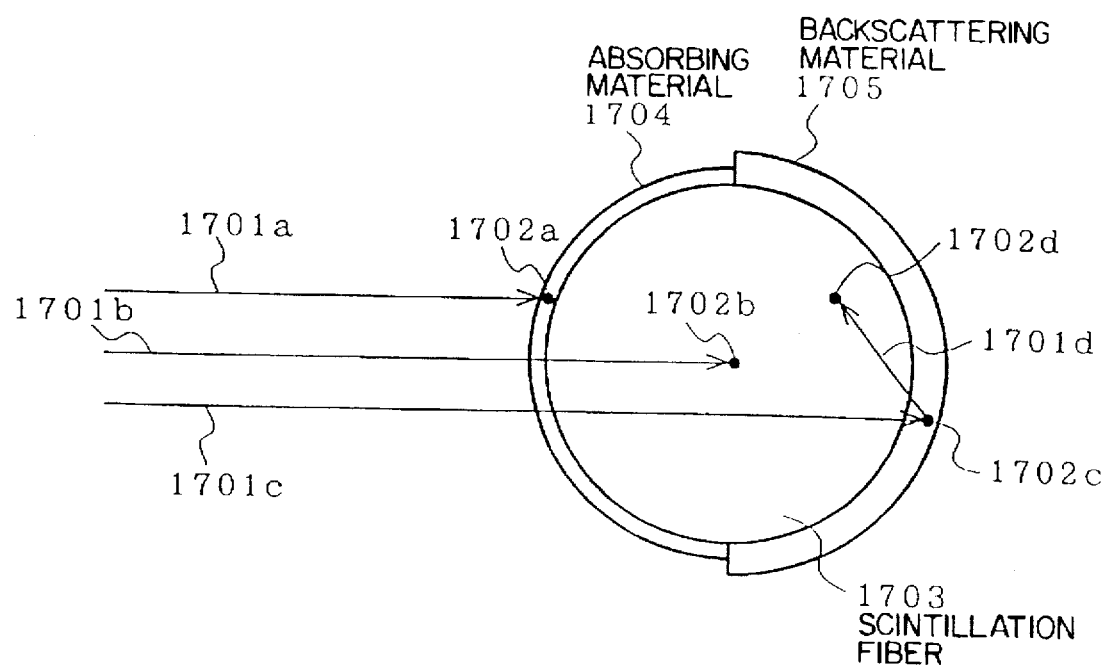
FIG. 20 is a cross-sectional view showing a nineteenth embodiment of the present invention.

FIG. 20 is a configurational view showing a nineteenth embodiment of the present invention. In FIG. 20, reference symbols 1701a, 1701b and 1701c indicate radiations to be measured respectively. Reference symbols 1702a, 1702b, 1702c and 1702d indicate points at which the radiations interact with their corresponding substances. Reference numeral 1703 indicates a cross-section of a scintillation fiber. Reference numeral 1704 indicates a cross-section of a material such as an aluminum foil applied to the scintillation fiber 1703, which is capable of absorbing a low-energy radiation. Reference numeral 1705 indicates a cross-section of a backscattering material such as lead bonded onto the scintillation fiber 1703, which is capable of backscattering a high-energy radiation. Reference symbol 1701d indicates a secondary radiation scattered by the backscattering material 1705.

The operation will now be described.

When the radiation 1701a is of a low-energy radiation (e.g., several keV through several ten keV), the radiation 1701a interacts with the aluminum foil 1704 at the point 1702a in the aluminum foil 1704 and the probability that the radiation 1701a will be absorbed, becomes high. On the other hand, when the radiation 1701c is of a high-energy radiation (e.g., 1 MeV or higher), the probability that the radiation 1701c will interact with the aluminum foil 1704, becomes low. Further, there is also a possibility of transmission of the radiation 1701c through the scintillation fiber 1703. A part of the low-energy radiation or a part of the high-energy radiation interacts with the scintillation fiber 1703 at the point 1702b in the scintillation fiber 1703 as in the case of the radiation 1701b. The above depends on the thickness of each of the aluminum foil 1704, the scintillation fiber 1703, and the lead 1705. However, the above can take place if the thickness thereof is adjusted. The backscattering material 1705 is provided to allow the radiation 1701c to interact with the scintillation fiber 1703. There is a possibility that the radiation 1701c will interact with the backscattering material 1705 at the point 1702c in the backscattering material 1705 after having passed through the scintillation fiber 1703. If the interaction produced therebetween at this time is of Compton scattering, then there is a possibility that a radiation, which is backscattered and produced on a secondary basis, will enter into the scintillation fiber 1703 again. Since this secondary radiation 1701d is lower in energy than the primary radiation, there is a strong likelihood that the radiation 1701d will interact with the scintillation fiber 1703 at the point 1702d in the scintillation fiber 1703.

The probability that the low-energy radiation will interact with its corresponding substance within the scintillation fiber, is forcibly lowered by providing the aluminum foil and the lead around the scintillation fiber as described above, thereby making it possible to increase the probability that the high-energy radiation will interact with its corresponding substance within the scintillation fiber.

When high-energy radiations normally become identical in dose rate to low-energy radiations, the number of the low-energy radiations increases. Namely, when the low-energy radiations enter into a detector even if they are identical in dose rate to each other, the counting rate of the detector increases. It is thus necessary to cut the low-energy radiations to some level as compared with the high-energy radiations in order to hold the sensitivity of the detector relative to the dose rate at a substantially constant level regardless of the energy. This results in the adoption of the above construction.

Thus, the sensitivity of the radiation detector with respect to the dose rate can be kept substantially constant regardless of the energy of a radiation.

Figure 21:
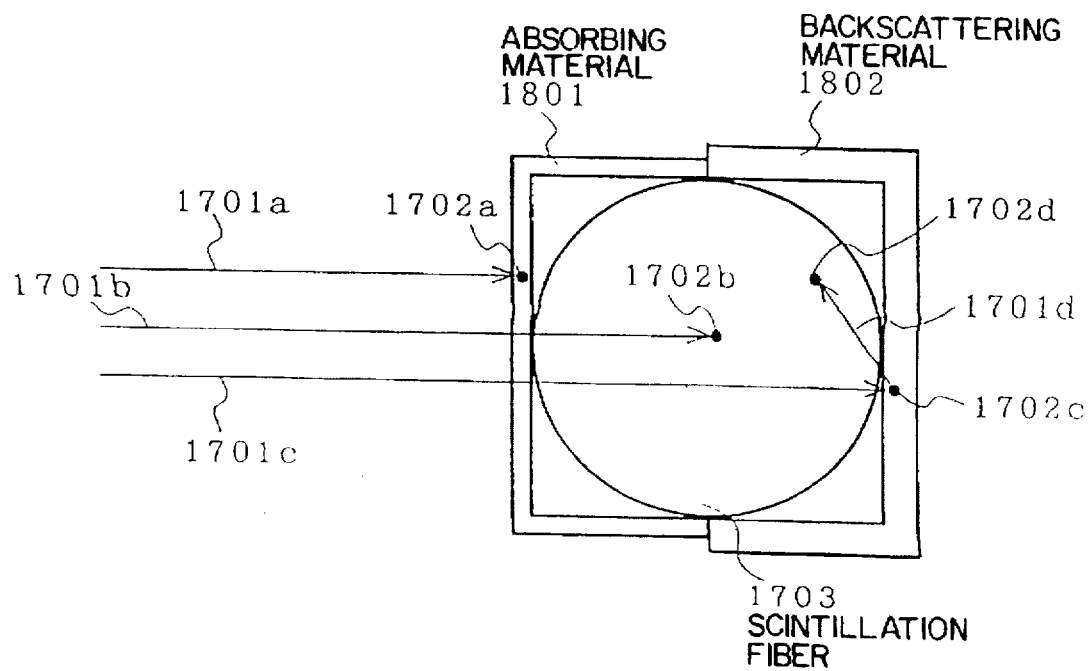
FIG. 21 is another cross-sectional view illustrating the nineteenth embodiment of the present invention.

In the nineteenth embodiment, the material for absorbing the low-energy radiation and the material for backscattering the high-energy radiation are made circular in cross section. Alternatively, they may be rectangular in cross section as shown in FIG. 21. In FIG. 21, reference numeral 1801 indicates an absorbing material for absorbing a low-energy radiation. Reference numeral 1802 indicates a material for backscattering a high-energy radiation.

Even if such a construction is adopted, the same effects as those obtained in the nineteenth embodiment can be obtained.

Figure 22:
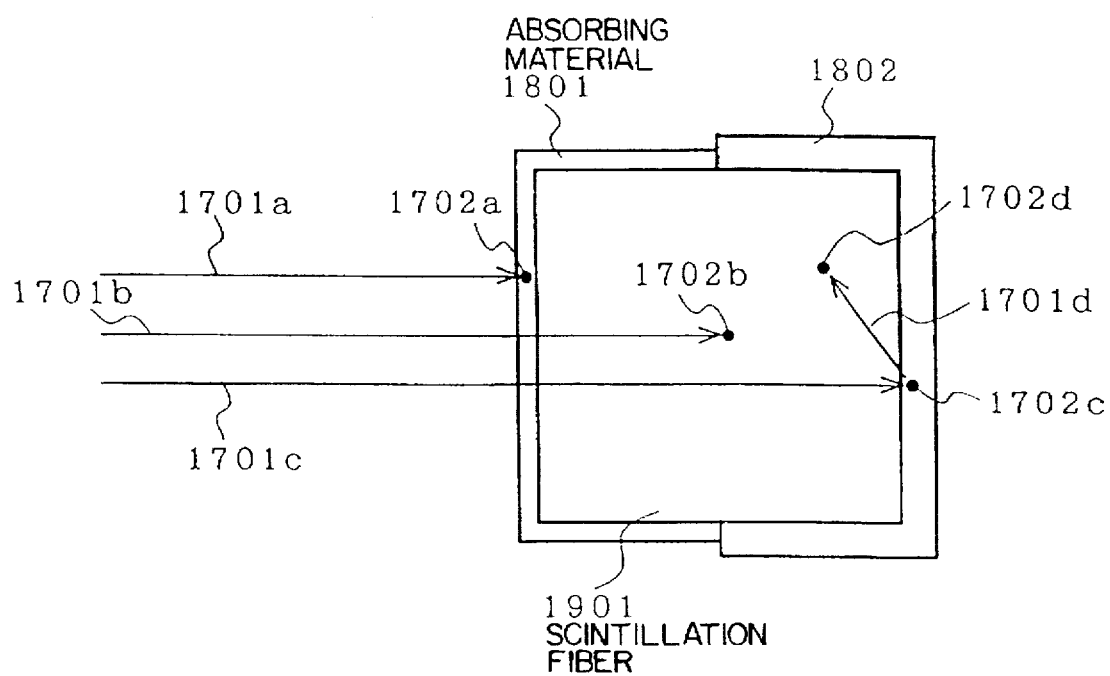
FIG. 22 is a further cross-sectional view depicting the nineteenth embodiment of the present invention.

FIG. 22 shows a case where the scintillation fiber employed in the nineteenth embodiment is rectangular in cross section. In FIG. 22, reference numeral 1901 indicates a scintillation fiber rectangular in cross section.

The same effects as those obtained in the nineteenth embodiment can also be brought about in the case of such a construction.

[Twentieth Embodiment]

Figure 23:
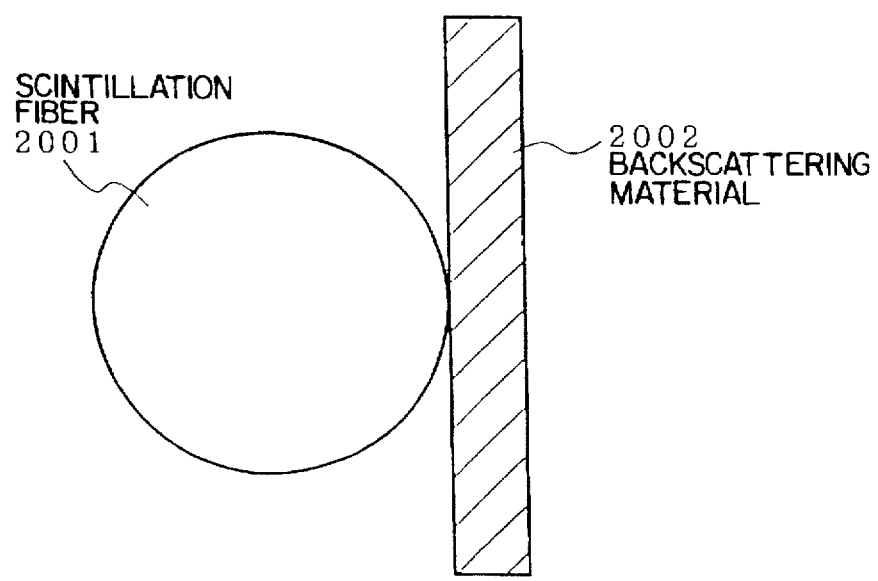
FIG. 23 is a cross-sectional view showing a twentieth embodiment of the present invention.

FIG. 23 is a configurational view illustrating a twentieth embodiment of the present invention. In FIG. 23, reference numeral 2001 indicates a cross-section of a scintillation fiber. Reference numeral 2002 indicates a backscattering material for backscattering radiations.

The operation of the present embodiment will now be described.

In order to keep the sensitivity of a detector substantially constant without recourse to the energy of an incident radiation as described in the nineteenth embodiment, it is necessary to cut a low-energy radiation as compared with a high-energy radiation. However, when the construction used in the nineteenth embodiment cannot be adopted, the backscattering material 2002 is disposed as shown in FIG. 23 so as to increase the probability of interaction of the high-energy radiation with the scintillation fiber and prevent a reduction in the probability of interaction with the low-energy radiation.

Owing to such a construction, the sensitivity of the radiation detector with respect to the dose rate can be kept substantially constant without depending on the radiation energy.

Figure 24:
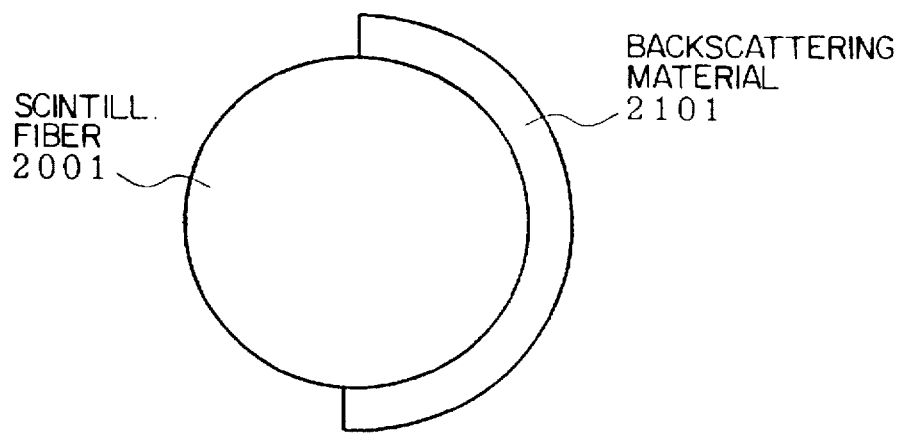
FIG. 24 is another cross-sectional view depicting the twentieth embodiment of the present invention.

FIG. 24 further shows a case where the backscattering material employed in the twentieth embodiment is wound around its corresponding portion of a scintillation fiber along the scintillation fiber. In FIG. 24, reference numeral 2101 indicates a backscattering material for backscattering a high-energy radiation.

Such a construction can bring about the same effects as those obtained in the twentieth embodiment.

[Twenty-First Embodiment]

Figure 25:
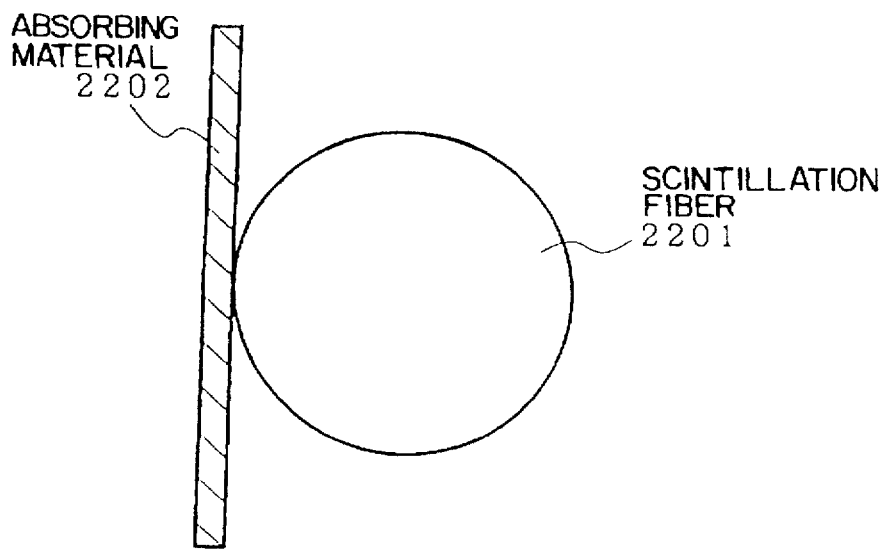
FIG. 25 is a cross-sectional view illustrating a twenty-first embodiment of the present invention.

FIG. 25 is a configurational view showing a twenty-first embodiment of the present invention. In FIG. 25, reference numeral 2201 indicates a scintillation fiber. Reference numeral 2202 indicates a cross-section of a material such as an aluminum foil stuck onto the scintillation fiber 2201, which is capable of absorbing a low-energy radiation.

The operation will now be described.

In order to keep the sensitivity of a detector substantially constant without recourse to the energy of an incident radiation as described in the nineteenth embodiment, it is necessary to cut a low-energy radiation with respect to a high-energy radiation and make the probability of interaction with the high-energy radiation as high as possible. However, when the construction used in the nineteenth embodiment cannot be adopted, the absorbing material 2202 is disposed forward of the scintillation fiber 2201 as shown in FIG. 25 so as to cut a part of the low-energy radiation before it enters the scintillation fiber 2201.

Owing to this construction, the sensitivity of the radiation detector relative to the dose rate can be held substantially constant without recourse to the energy of a radiation.

Figure 26:
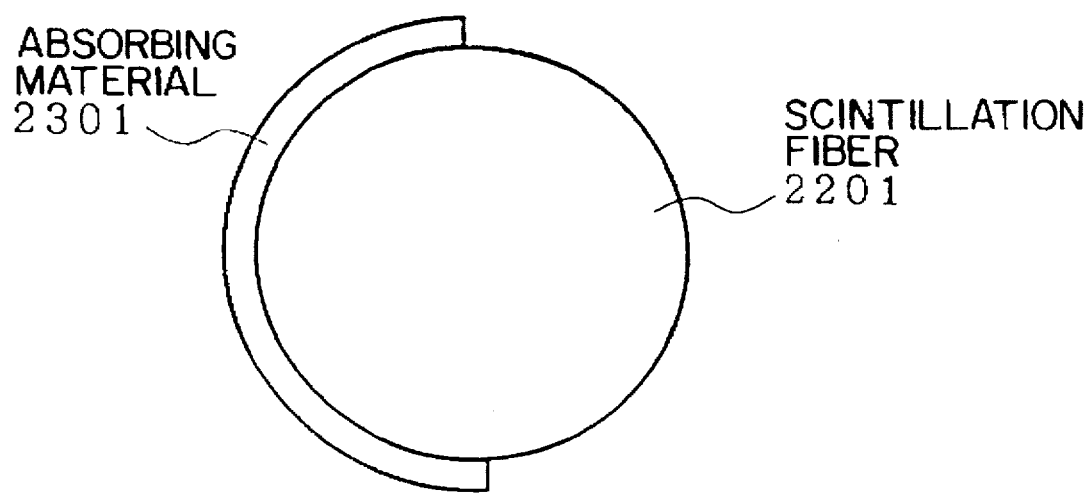
FIG. 26 is another cross-sectional view showing the twenty-first embodiment of the present invention.

FIG. 26 further shows a case where the absorbing material employed in the twenty-first embodiment is wound on its corresponding portion of a scintillation fiber along the scintillation fiber. In FIG. 26, reference numeral 301 indicates an absorbing material for absorbing a low-energy radiation.

In the case of such a construction, the same effects as those obtained in the twenty-first embodiment can also be brought about.

[Twenty-Second Embodiment]

In the present embodiment, a scintillation fiber is different from a conventional one. An inorganic monocrystal scintillation material such as bismuth-germanate or the like is used as a material used for the scintillation fiber.

Since the bismuth-germanate is relatively low in scintillation efficiency light absorption rate but includes a higher atomic number element and has a large specific gravity, the probability that the bismuth-germanate will interact with a radiation, becomes high. It is therefore possible to increase the probability that a high-energy radiation will react with the scintillation fiber and to flatten or smooth the sensitivity of a dose rate with respect to the energy of the radiation.

[Twenty-Third Embodiment]

Figure 27:
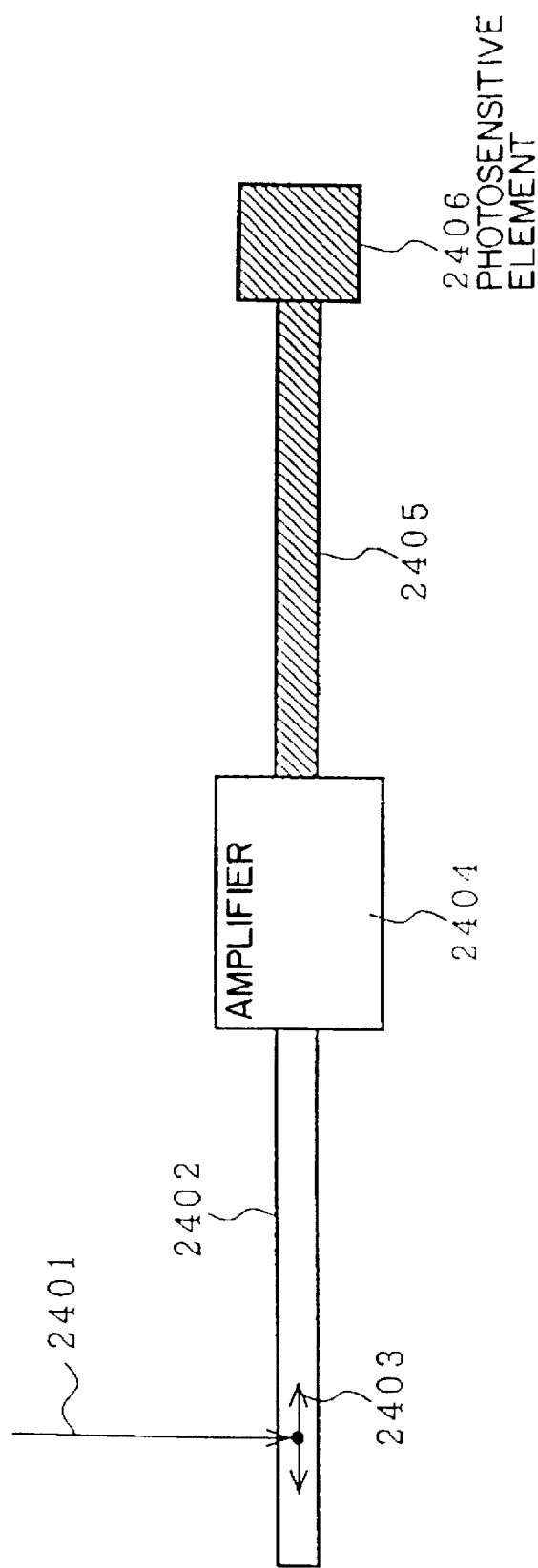
FIG. 27 is a partial schematic view illustrating a twenty-third embodiment of the present invention.

FIG. 27 is a configurational view showing a twenty-third embodiment of the present invention. In FIG. 27, reference numeral 2401 indicates a radiation or an optical pulse in a given wavelength region. Reference numeral 2402 indicates a scintillation fiber. Reference numeral 2403 indicates an optical pulse generated by fluorescence. Reference numeral 2404 indicates a semiconductor light-amplifier module using a GaAIAs semiconductor, for example. Reference numeral 2405 indicates an optical delay fiber. Reference numeral 2406 indicates a photosensitive element. Further, a semiconductor light amplifier amplifies the height of an optical pulse propagated through the scintillation fiber in the direction opposite to that of the optical pulse 2403.

The operation will now be described.

When the radiation or optical pulse 2401 in the given wavelength region falls on the scintillation fiber 2402, fluorescence is produced so as to generate the optical pulse 2403. When the optical pulse 2403 is transmitted through the scintillation fiber 2402, an optical loss is produced and hence the value of the pulse height is lowered. To supplement the loss, the semiconductor light-amplifier module 2404 is connected to the scintillation fiber 2402 so as to amplify the height of the optical pulse 2403. Thereafter, the amplified optical pulse is transmitted through the optical delay fiber 2405, followed by inputting to the photosensitive element 2406 where the optical pulse is converted into an electric pulse.

The transmission loss of light transmitted within the scintillation fiber can be supplemented owing to such a construction, thereby making it possible to increase a measuring range.

In the twenty-third embodiment, the semiconductor light-amplifier module 2404 and the photosensitive element 2406 shown in FIG. 27 may be directly connected to each other without the optical delay fiber 2405.

In the case of such a construction, the transmission loss of light transmitted within the fiber can also be supplemented, thereby making it possible to increase a measuring range.

[Twenty-Fourth Embodiment]

Figure 28:
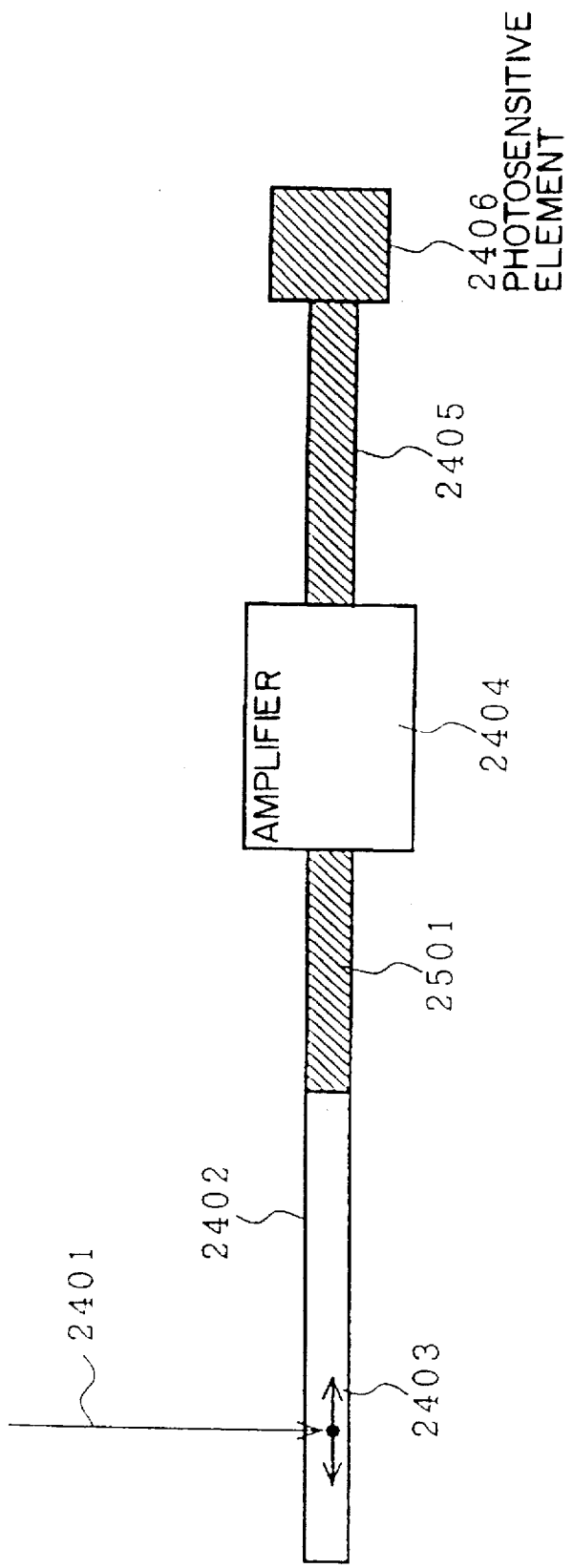
FIG. 28 is a partial schematic view depicting a twenty-fourth embodiment of the present invention.

FIG. 28 is a configurational view showing a twenty-fourth embodiment of the present invention. In FIG. 28, reference numeral 2501 indicates a wavelength shifting fiber doped with a wavelength shifter material.

When the wavelength of an optical pulse 2403 generated within a scintillation fiber 2402 is shorter than a wavelength band that can be amplified by a semiconductor light-amplifier module 2404, the wavelength shifting fiber 2501 is inserted between the scintillation fiber 2402 and the semiconductor light-amplifier module 2404 so that the wavelength of the propagated optical pulse is shifted to the wavelength band that can be amplified by the semiconductor light-amplifier module 2404.

According to this construction, even if the wavelength of the optical pulse 2403 generated in the scintillation fiber 2402 is shorter than the amplifierable wavelength band of the semiconductor light-amplifier module 2404, the wavelength thereof can be amplified by shifting it to the amplifierable wavelength band. Therefore, the transmission loss of light transmitted within the fiber can be supplemented so that a measuring range can be expanded

[Twenty-Fifth Embodiment]

Figure 29:
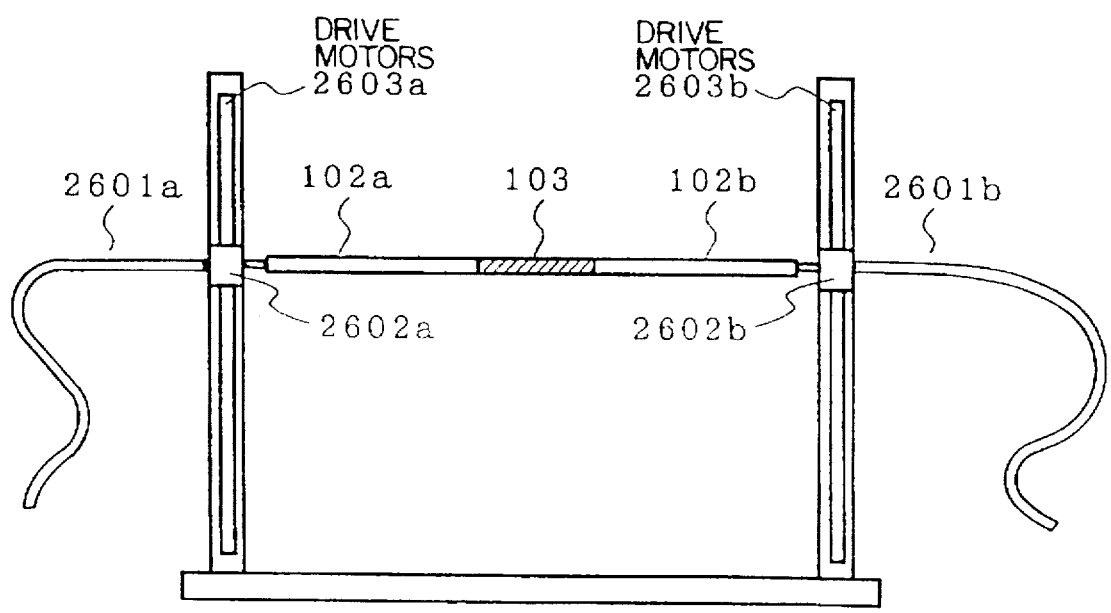
FIG. 29 is a partial schematic view showing a twenty-fifth embodiment of the present invention.

FIG. 29 is a configurational view showing a twenty-fifth embodiment of the present invention. In FIG. 29, reference symbols 2601a and 2601b respectively indicate transmission optical fibers connected to their corresponding scintillation fibers 102a and 102b and identical in length to each other. Reference symbols 2602a and 2602b respectively indicate support members for supporting the transmission optical fibers. Reference symbols 2603a and 2603b indicate drive motors with rails respectively. Incidentally, photosensitive elements are respectively connected to the leading ends of the transmission optical fibers and are activated in the same manner as the first embodiment.

The operation will now be described.

The support members 2602a and 2602b for supporting the transmission optical fibers 2601a and 2601b respectively are fixed to their corresponding drive motors 2603a and 2603b. When the drive motors 2603a and 2603b are driven, the support members 2602a and 2602b are raised or lowered over the rails. Thus, a range of the scintillation fiber, for detecting a radiation or an optical pulse in a given wavelength region is expanded. In practice, the drive motors 2603a and 2603b with the rails cause the scintillation fibers 102a and 102b to move to predetermined positions. Further, the radiation or the optical pulse is measured at the predetermined positions as in the first embodiment. After completion of its measurement, the drive motors 2603a and 2603b cause the scintillation fibers 102a and 102b to move to the following positions again, followed by measurement of the radiation or the optical pulse. By repeating this processing several times, a wide-range measurement is made possible.

Since the transmission optical fibers 2601a and 2601b simply transmit the optical pulses propagated through the scintillation fibers 102a and 102b to their corresponding photosensitive elements, they do not exert influences on the principle of measurement.

[Twenty-Sixth Embodiment]

Figure 30:
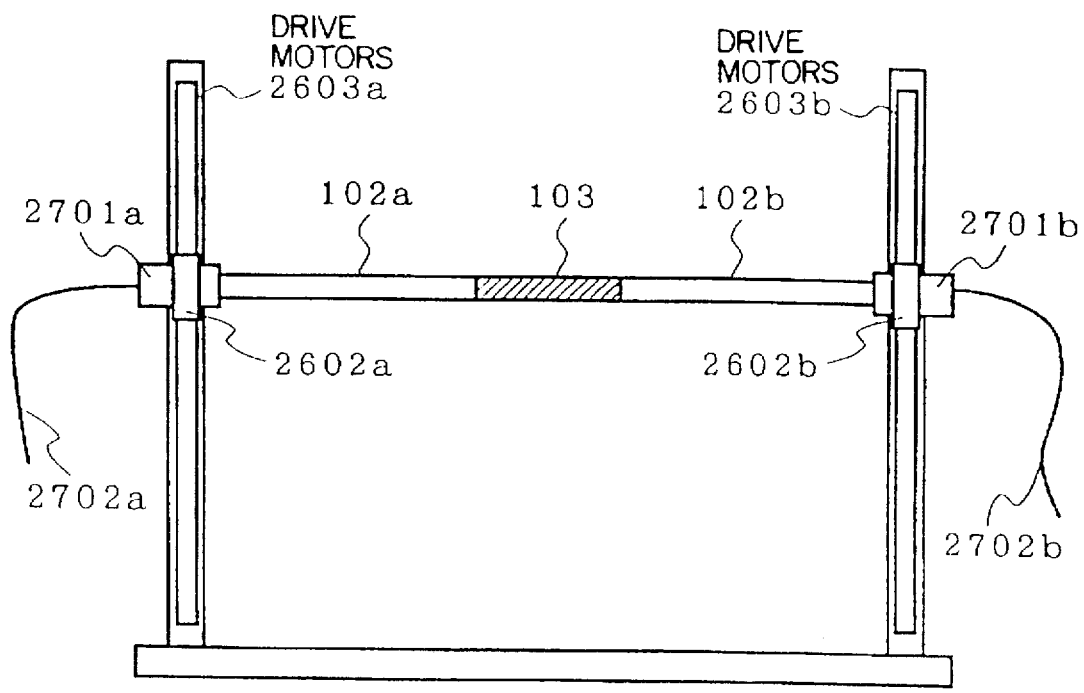
FIG. 30 is a partial schematic view illustrating a twenty-sixth embodiment of the present invention.

FIG. 30 is a configurational view showing a twenty-sixth embodiment of the present invention. In FIG. 30, reference symbols 2701a and 2701b respectively indicate O/E conversion modules including photosensitive elements and preamplifiers connected to their corresponding scintillation fibers 102a and 102b. Reference symbols 2702a and 2702b respectively indicate cables for transmitting signals outputted from the O/E conversion modules 2701a and 2701b. Incidentally, constant fraction discriminators are connected to their corresponding leading ends of the transmission cables 2702a and 2702b and are activated in a manner similar to the first embodiment.

In the case of this construction, the same effects as those obtained in the twenty-fifth embodiment can also be brought about.

[Twenty-Seventh Embodiment]

Figure 31:
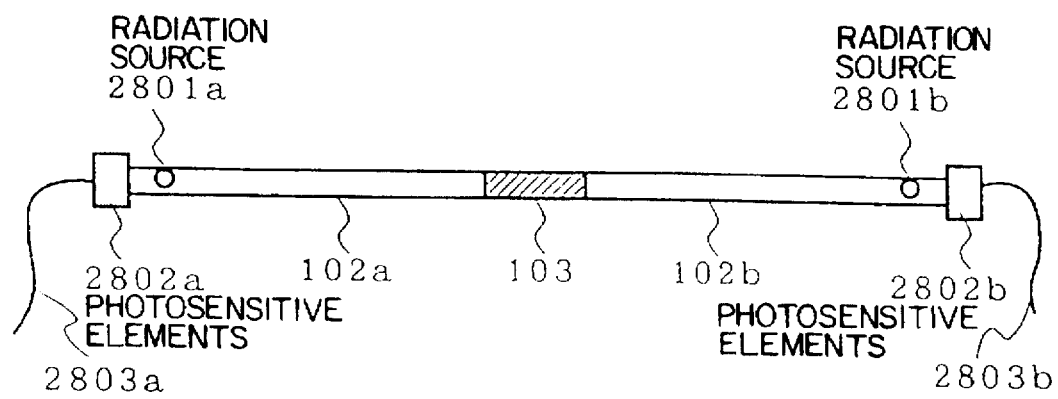
FIG. 31 is a partial schematic view depicting a twenty-seventh embodiment of the present invention.

FIG. 31 is a configurational view showing a twenty-seventh embodiment of the present invention. In FIG. 31, reference symbols 2801a and 2801b respectively indicate standard radiation sources embedded in their corresponding scintillation fibers 102a and 102b and used as standards for position measurements. Each standard radiation source is constructed by selectively etching only a cladding using the difference in composition between the cladding and each core and embedding, for example, cesium 137 into a recess (whose diameter is 1 mm or so, for example) defined by etching. However, the etching of the cladding is effected not so as to reach each core and exert an influence on the propagation of light within each core. Reference symbols 2802a and 2802b respectively indicate photosensitive elements connected to their corresponding scintillation fibers 102a and 102b. Reference symbols 2803a and 2803b respectively indicate cables for transmitting electric signals outputted from their corresponding photosensitive elements 2802a and 2802b.

The operation will now be described.

In the prior art, the position where the radiation or the optical pulse in the given wavelength region enters into the scintillation fiber 102a or 102b, is calculated from the output (corresponding to the difference between the time intervals during which the optical pulses propagated to both ends of the fiber reach their corresponding photosensitive elements) and the speed of light transmitted through the fiber. However, the speed of light propagated through the fiber slightly varies depending on the refractive index and shape of the fiber and the way of laying out the fiber. Thus, an error is developed in the position measurement. To compensate for the error, the standard radiation sources 2801a and 2801b are embedded into predetermined positions respectively. As a result, fluorescence is produced in the cores provided at the positions where the standard radiation sources 2801a and 2801b are embedded, to thereby generate optical pulses. The resultant pulses are propagated through the fibers so as to reach the photosensitive elements 2802a and 2802b provided at both ends. As the result of measurement (corresponding to one obtained by representing values outputted from a multichannel pulse-height analyzer in the form of a graph), peaks are respectively outputted to the locations where the standard radiation sources 2801a and 2801b are embedded. The position where the measuring radiation or optical pulse in the given wavelength region enters into the corresponding fiber, can be determined with sufficient accuracy based on the difference in position between the two peaks and the difference between the positions where the standard radiation sources are embedded. Incidentally, the principle of measurement is identical to that employed in the first embodiment.

Figure 32:
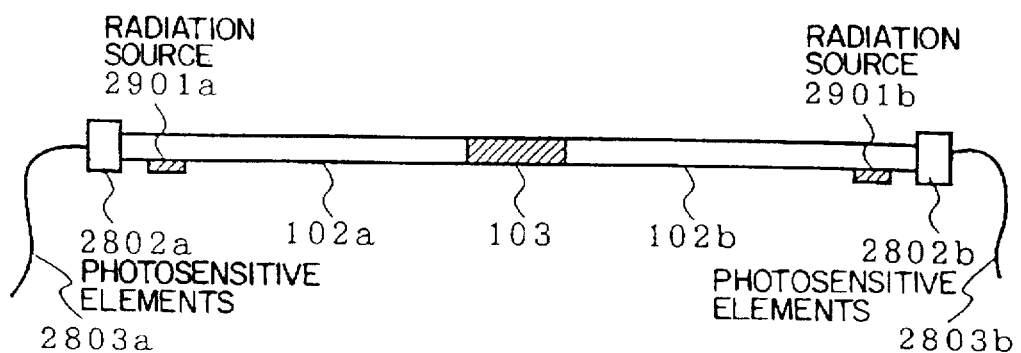
FIG. 32 is another partial schematic view showing the twenty-seventh embodiment of the present invention.

FIG. 32 is a configurational view showing a modification of the twenty-seventh embodiment. In FIG. 32, reference symbols 2901a and 2901b respectively indicate standard radiation sources of such types that, for example, radiation nuclides are allowed to uniformly diffuse into glass beads each having a diameter of 1 mm or so and the glass beads are embedded in plastic plates. The standard radiation sources 2901a and 2901b are bonded onto their corresponding scintillation fibers 102a and 102b.

Owing to this construction, the same effects as those obtained in the twenty-seventh embodiment can be brought about.

Incidentally, the twenty-seventh embodiment shows the case where the two standard radiation sources are respectively embedded in or bonded onto the scintillation fibers. However, two or more standard radiation sources may be respectively embedded in or bonded onto scintillation fibers or an optical delay fiber according to the lengths of the scintillation fibers or the length of the optical delay fiber.

In the case of this construction, the same effects as those obtained in the twenty-seventh embodiment can also be brought about.

[Twenty-Eighth Embodiment]

Figure 33:
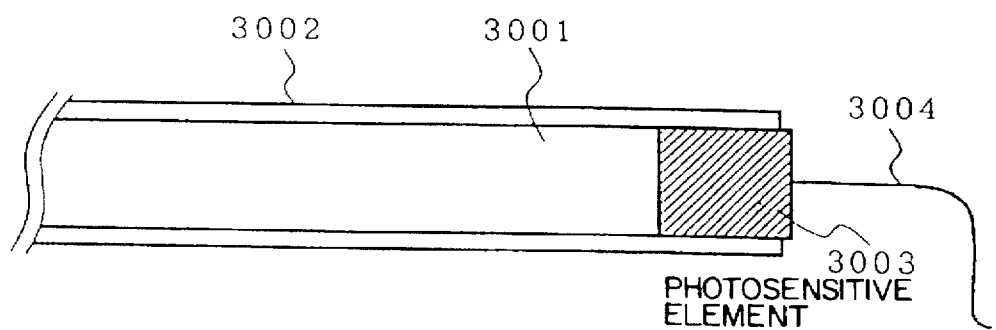
FIG. 33 is a cross-sectional view illustrating a twenty-eighth embodiment of the present invention.

FIG. 33 is a configurational view showing a twenty-eighth embodiment of the present invention. In FIG. 33, reference numeral 3001 indicates a core in a scintillation fiber or an optical delay fiber. Reference numeral 3002 indicates a cladding in the scintillation fiber or optical delay fiber. Reference numeral 3003 indicates a photosensitive element wherein a cathode, an anode and the like are three-dimensionally shaped in the form of an array by micromachining technology. Reference numeral 3004 indicates a cable for transmitting an electric signal outputted from the photosensitive element 3003 to a preamplifier. No coating is applied to the outside of the cladding in FIG. 33. However, whether or not the coating is applied thereto, is determined depending on measuring conditions and measuring environments.

Incidentally, the photosensitive element 3003 is embedded in the scintillation fiber or the optical delay fiber in accordance with the following technique or method. Firstly, only the core is selectively etched using the difference in composition between the cladding and core of the scintillation fiber or the optical delay fiber to thereby form a recess or concave portion. The photosensitive element 3003 is then embedded in the recess.

A detector can be reduced in size owing to such a construction. Further, an optical pulse propagated through the fiber can be efficiently detected by the photosensitive element 3003.

[Twenty-Ninth Embodiment]

Figure 34:
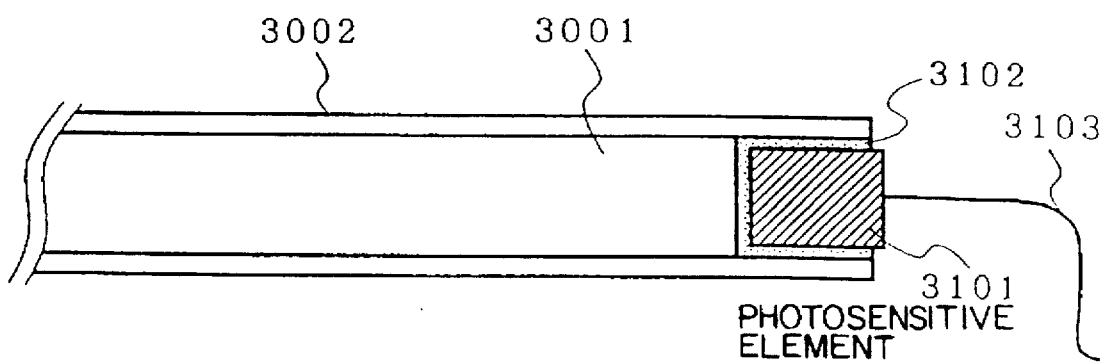
FIG. 34 is a cross-sectional view depicting a twenty-ninth embodiment of the present invention.
Figure 35:
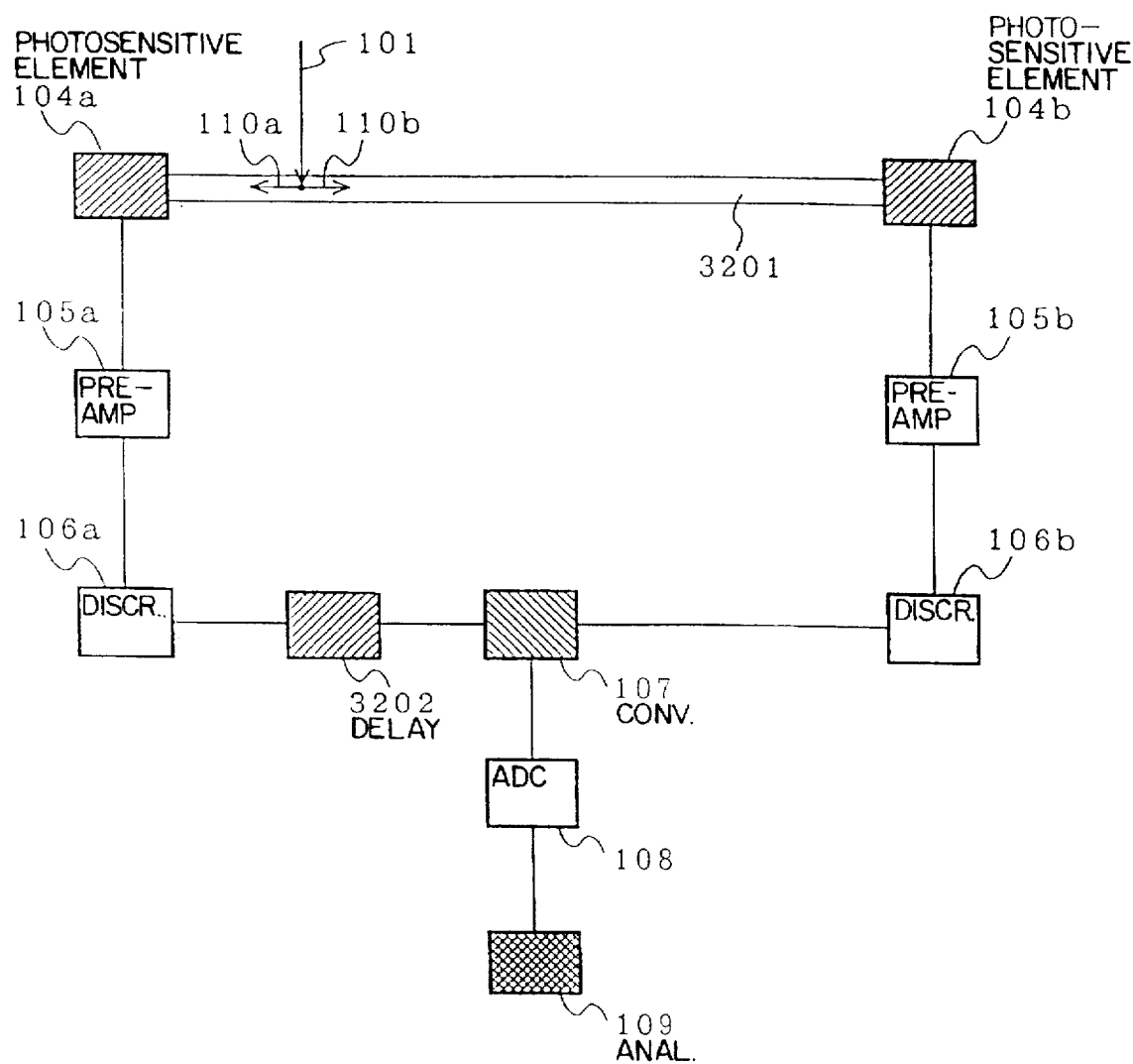
FIG. 35 is an overall schematic view showing a distribution type detector using a conventional scintillation fiber.

FIG. 34 is a configurational view illustrating a twenty-ninth embodiment of the present invention. In FIG. 34, reference numeral 3101 indicates such a photosensitive element as described in the twenty-eighth embodiment. Reference numeral 3102 indicates, for example, a silicon adhesive poured into a spacing defined between the photosensitive element 3101 and a recess or concave portion defined by processing in a core of a scintillation fiber or an optical delay fiber. Reference numeral 3103 indicates a cable for transmitting an electric signal outputted from the photosensitive element 3101 to a preamplifier. No coating is applied to the outside of a cladding in FIG. 34. However, whether or not the coating is applied thereto, is decided depending on measuring conditions and measuring environments.

There is a possibility that a space will be defined between the photosensitive element 3101 and the recess defined in the core of the fiber as shown in FIG. 34. In order to detect an optical pulse which has been efficiently propagated through the fiber even if the space exists, the adhesive 3102 is poured into the spacing to fix the photosensitive element 3101.

In the case of this construction, a detector can also be reduced in size in a manner similar to the twenty-eighth embodiment. Further, the optical pulse transmitted through the fiber can be efficiently detected by the photosensitive element 3101.

Since the invention is constructed as described above, the following advantageous effects can be brought about.

According to a first aspect of the present invention, since a configuration wherein an optical delay fiber is connected as well as scintillation fibers, is adopted, the simplification of a measuring circuit system capable of raising position resolution, the integration of measuring circuits into a single system, etc. can be achieved.

According to a second aspect of the present invention, since an optical delay fiber is centrally inserted between scintillation fibers and a time-to-pulse height converter is provided wherein a terminal supplied with a firstly-propagated signal is not distinguished from a terminal supplied with a subsequently-propagated signal, a measuring range of the time-to-pulse height converter can be reduced and hence position resolution can be improved as compared with the prior art.

According to a third aspect of the present invention, since one end face of a scintillation fiber and an end face of an optical delay fiber connected to the other end of the scintillation fiber are connected to the same photosensitive element, the photosensitive element, a preamplifier and a constant fraction discriminator are provided as single and measuring circuits are integrated into one system by using a measuring circuit capable of measuring the difference between time intervals necessary for two optical signals introduced into the single photosensitive element, an error produced due to the difference in characteristic between measuring instruments can be eliminated and a detector can be reduced in size.

According to a fourth aspect of the present invention, since a photosensitive element is connected to one end face of a scintillation fiber, a reflector is attached to an end face of an optical delay fiber connected to the other end of the scintillation fiber and measuring circuits are brought into one system by using a measuring circuit capable of measuring the difference between time intervals necessary for two optical signals launched into the single photosensitive element, an error developed due to the difference in characteristic between measuring instruments can be eliminated and a detector can be reduced in size.

According to a fifth aspect of the present invention, since a preamplifier capable of outputting two signals therefrom in response to a single signal inputted thereto is provided, the distribution of energy can be measured as well as the incident position of the radiation or the optical pulse in the specific wavelength.

According to a sixth aspect of the present invention, since a loss of an optical signal produced by its propagation distance is compensated by software or hardware, the difference between distribution results on energy at respective incident positions of a radiation to be measured or a light pulse to be measured, in a given wavelength region can be reduced.

According to a seventh aspect of the present invention, since a plurality of scintillation fibers are shaped in the form of a bundle and the bundle is constructed as a detecting unit, the probability that an incident radiation or optical pulse in a given wavelength region will react with each scintillation fiber within the scintillation fiber bundle, can be raised and the quantity of light incident on a photosensitive element can be also increased.

According to an eighth aspect of the present invention, since a fiber plate obtained by shaping a plurality of scintillation fibers in the form of a plate is constructed as a detecting unit, a position where a radiation or an optical pulse in a given wavelength region enters into the fiber plate, can be measured on a two-dimensional basis.

According to a ninth aspect of the present invention, since a plurality of fiber plates are disposed in parallel, a distribution type detector using scintillation fibers can measure a track of a radiation or a light pulse in a given wavelength region.

According to a tenth aspect of the present invention, since fiber plates are stacked on one another so that fiber extending directions intersect at right angles, a distribution type detector using scintillation fibers can two-dimensionally measure each incident position of a radiation or an optical pulse in a given wavelength region using a reduced number of photosensitive elements.

According to an eleventh aspect of the present invention, a distribution type detector using a scintillation fiber is constructed such that a material capable of absorbing a low-energy radiation is disposed forward of the scintillation fiber used as a detecting unit. Owing to this construction, the difference between the probability that the low-energy radiation will react within the scintillation fiber and the probability that a high-energy radiation will react within the scintillation fiber, can be reduced and the sensitivity of a dose rate with respect to the energy of the radiation can be flattened.

According to a twelfth aspect of the present invention, a distribution type detector using a scintillation fiber is constructed such that a material capable of backscattering a high-energy radiation is disposed behind the scintillation fiber used as a detecting unit. Owing to this construction, the difference between the probability that a low-energy radiation will react within the scintillation fiber and the probability that the high-energy radiation will react within the scintillation fiber, can be reduced and the sensitivity of a dose rate with respect to the energy of the radiation can be flattened.

According to a thirteenth aspect of the present invention, a distribution type detector using a scintillation fiber is constructed such that an inorganic scintillation material is used as a material for the scintillation fiber. Owing to this construction, the probability that a high-energy radiation will react within the scintillation fiber, can be raised.

According to a fourteenth aspect of the present invention, a distribution type detector using a scintillation fiber is provided with a light amplifier on a path of the scintillation fiber or an optical delay fiber. Owing to this construction, a transmission loss of light propagated within the fiber can be supplemented and a measuring range can be increased.

According to a fifteenth aspect of the present invention, a distribution type detector using a scintillation fiber is constructed such that a fiber doped with a wavelength shifter material is provided between the scintillation fiber and a light amplifier. Owing to this construction, the wavelength of each optical pulse produced by fluorescence within the scintillation fiber can be shifted to an amplifierable wavelength band of the light amplifier by the wavelength shifter even if the wavelength of each optical pulse produced within the scintillation fiber is shorter than the amplifierable wavelength band thereof, with the result that a transmission loss of light propagated within the fiber can be supplemented and a measuring range can be expanded.

According to a sixteenth aspect of the present invention, a distribution type detector using scintillation fibers is provided with radiation sources respectively attached to the scintillation fibers. By providing the radiation sources used as standards for position measurement in this way, position accuracy with respect to the measurement of a position where a radiation or an optical pulse in a given wavelength region enters, can be improved.

According to a seventeenth aspect of the present invention, a distribution type detector using a scintillation fiber is one of a type wherein the scintillation fiber which serves as a detecting portion, can be moved. By doing so, a measuring range can be expanded and a spatial distribution of a radiation to be measured or an optical pulse in a given wavelength region can be measured.

According to an eighteenth aspect of the present invention, since a photosensitive element is embedded in an end of a fiber by micromachining technology, a detector can be reduced in size and a loss of light transmitted within the fiber, which is produced at the end face of the fiber, can be reduced, thereby making it possible to expand a measuring range.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A distribution type detector, comprising:
  a scintillation fiber for generating optical pulses, which propagate in both directions of said scintillation fiber, in response to a radiation or a light pulse in a given specific wavelength region;
  photosensitive elements, coupled to both ends of said scintillation fiber, for generating electrical signals in response to said optical pulses;
  amplifiers, coupled to said photosensitive elements, for amplifying said electrical signals output from said photosensitive elements;

timing pulse generating circuits for outputting timing pulses based on said signals output from said amplifiers;

a time-to-pulse height converter for generating a pulse signal having a pulse height proportional to a time difference between said timing pulses, said time difference being based on the optical pulses propagated in both directions of said scintillation fiber;

an analog-to-digital converter for converting the pulse signal output from said time-to-pulse height converter into a digital signal;

a multichannel pulse-height analyzer for counting said digital signal output from said analog-to-digital converter according to a value thereof; and signal delaying means for creating said time difference, measurable by said time-to-pulse height converter, between the timing pulses;

said distribution type detector detecting an incident position of the radiation or the light pulse based on the time difference;

said signal delaying means comprising an optical delay fiber which is made nonreactive to the radiation or the light pulse in the specific wavelength region.

2. A distribution type detector according to claim 1, wherein said optical delay fiber is disposed in a central portion of said scintillation fiber and said time-to-pulse height converter generates said pulse signal regardless of an order in which said timing pulses are input thereto.

3. A distribution type detector according to claim 2, further comprising a second analog-to-digital converter and a second multichannel pulse-height analyzer for measuring an energy spectrum of the optical pulse based on branched output signals, said branched output signals being obtained from an output produced from at least one of said two amplifiers.

4. A distribution type detector according to claim 3, wherein a loss produced due to a propagation distance of the optical pulse is compensated for based on information about the incident position of the radiation or the light pulse in the specific wavelength region.

5. A distribution type detector according to of claim 1, wherein said scintillation fiber comprises a plurality of fibers formed as a bundle.

6. A distribution type detector according to of claim 1, wherein said scintillation fiber comprises a plurality of fibers shaped in the form of a fiber plate.

7. A distribution type detector according to claim 6, further comprising a plurality of fiber plates disposed in parallel.

8. A distribution type detector according to claim 6, wherein at least one pair of a plurality of fiber plates are stacked on one another so that fiber extending directions in one of said fiber plates in said pair intersect at right angles to fiber extending directions in the other of said fiber plates in said pair.

9. A distribution type detector according to claim 1, wherein material for absorbing a low-energy radiation is disposed ahead of said scintillation fiber.

10. A distribution type detector according to claim 1, wherein material for backscattering a high-energy radiation is disposed behind said scintillation fiber.

11. A distribution type detector according to claim 1, wherein inorganic scintillation material is used as material for said scintillation fiber.

12. A distribution type detector according to of claim 1, wherein a light amplifier is inserted on a path of said scintillation fiber or said optical delay fiber.

13. A distribution type detector according to claim 12, wherein an optical fiber doped with a wavelength shifter material is inserted on an input side of said light amplifier.

14. A distribution type detector according to claim 1, wherein at least one radiation source for calibration is mounted in said scintillation fiber.

15. A distribution type detector according to claim 1, wherein at least one drive mechanism for moving said scintillation fiber is provided.

16. A distribution type detector according to claim 1, wherein said photosensitive elements are embedded in said scintillation fiber or said optical delay fiber.

17. A distribution type detector, comprising:

a scintillation fiber for generating optical pulses in response to a radiation or a light pulse in a given specific wavelength region;

a photosensitive element connected to one end of said scintillation fiber, for detecting the optical pulses and outputting signals;

an amplifier for amplifying signals output from said photosensitive element;

a timing pulse generating circuit for outputting timing pulses based on said signals output from said amplifier;

a time-to-pulse height converter for generating a pulse signal having a pulse height proportional to a time difference between said timing pulses, said time difference being based on the optical pulses propagated in both directions of said scintillation fiber;

an analog-to-digital converter for converting the pulse signal output from said time-to-pulse height converter into a digital signal;

a multichannel pulse-height analyzer for counting said digital signal output from said analog-to-digital converter according to a value thereof; and signal delaying means for creating said time difference, measurable by said time-to-pulse height converter, between said timing pulses;

said distribution type detector detecting an incident position of the radiation or the light pulse based on the time difference;

said signal delaying means comprising an optical delay fiber which is made nonreactive to the radiation or the light pulse in the specific wavelength region, one end of said optical delay fiber is connected to the other end of said scintillation fiber, and the other end of said optical delay fiber is connected to said photosensitive element.

18. A distribution type detector, comprising:

a scintillation fiber for generating optical pulses in response to a radiation or a light pulse in a given specific wavelength region;

a photosensitive element connected to one end of said scintillation fiber, for detecting the optical pulses and outputting signals;

an amplifier for amplifying signals output from said photosensitive element;

a timing pulse generating circuit for outputting timing pulses based on said signals output from said amplifier;

a time-to-pulse height converter for generating a pulse signal having a pulse height proportional to a time difference between said timing pulses, said time difference being based on the optical pulses propagated in both directions of said scintillation fiber;

an analog-to-digital converter for converting the pulse signal output from said time-to-pulse height converter into a digital signal;

a multichannel pulse-height analyzer for counting said digital signal output from said analog-to-digital converter according to a value thereof; and signal delaying means for creating said time difference, measurable by said time-to-pulse height converter, between said timing pulses;

said distribution type detector detecting an incident position of the radiation or the light pulse based on the time difference;

said signal delaying means comprising an optical delay fiber which is made nonreactive to the radiation or the light pulse in the specific wavelength region, one end of said optical delay fiber is connected to the other end of said scintillation fiber, and a reflector is attached to the other end of said optical delay fiber.

* * * * *